US012731700B2

(12) United States Patent
Fisher et al.

(10) Patent No.: US 12,731,700 B2
(45) Date of Patent: Sep. 8, 2026

(54) HEAT PIPE FUEL ELEMENT AND FISSION REACTOR INCORPORATING SAME, PARTICULARLY HAVING PHYLLOTAXIS SPACING PATTERN OF HEAT PIPE FUEL ELEMENTS, AND METHOD OF MANUFACTURE

(71) Applicant: BWXT Advanced Technologies LLC, Lynchburg, VA (US)

(72) Inventors: Benjamin D. Fisher, Lynchburg, VA (US); Craig D. Gramlich, Forest, VA (US); Ross E. Pivovar, Lynchburg, VA (US); John R. Salasin, Lynchburg, VA (US); Jonathan K. Witter, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 328 days.

(21) Appl. No.: 18/220,335

(22) Filed: Jul. 11, 2023

(65) Prior Publication Data

US 2024/0021327 A1 Jan. 18, 2024

Related U.S. Application Data

(60) Provisional application No. 63/388,324, filed on Jul. 12, 2022.

(51) Int. Cl.
*G21C 15/257* (2006.01)
*F28D 15/04* (2006.01)
(Continued)

(52) U.S. Cl.
CPC ......... *G21C 15/257* (2013.01); *F28D 15/046* (2013.01); *G21C 3/08* (2013.01); *G21C 15/06* (2013.01)

(58) Field of Classification Search
CPC .. F28D 15/0233; F28D 15/046; G21C 15/257
See application file for complete search history.

(56) References Cited

U.S. PATENT DOCUMENTS 3,031,388 A * 4/1962 Barchet .................... G21C 3/28 376/334
3,141,227 A * 7/1964 Klepfer .................... G21C 3/36 53/436

(Continued)

FOREIGN PATENT DOCUMENTS

DE 9007771 U1 * 10/1995 ........... G21C 3/3206

OTHER PUBLICATIONS

Pivovar, Ross E. High temperature microporous coatings: The effects of wetting and wicking on nucleate boiling and CHF. MS thesis. The University of Texas at Arlington, 2009. (Year: 2009).*

(Continued)

*Primary Examiner* — Lily C Garner
(74) *Attorney, Agent, or Firm* — Morgan, Lewis & Bockius LLP

(57) ABSTRACT

A heat pipe fuel element includes an evaporation section, a condensing section, a capillary section connecting the evaporation section to the condensing section, and a primary coolant. In a cross-section in a plane perpendicular to a longitudinal axis of the evaporation section, the heat pipe fuel element includes a cladding layer enclosing an interior area including a fuel body formed of a fissionable fuel composition and that has an outer surface oriented toward the cladding layer and an inner surface defining a periphery of a vaporization space of the evaporation section. The fuel body has a structure with a shape corresponding to a mathematically-based periodic solid, such as a triply periodic minimal surface (TPMS), and the evaporation sections of a plurality of heat pipe fuel elements are arranged in a (Continued)

phyllotaxis pattern (as seen in a cross-section in a plane perpendicular to a longitudinal axis of the active core region).

25 Claims, 14 Drawing Sheets

(51) Int. Cl.
*G21C 3/08* (2006.01)
*G21C 15/06* (2006.01)

(56) References Cited

U.S. PATENT DOCUMENTS

| | | | | |
|---|---|---|---|---|
| 3,262,860 | A * | 7/1966 | Zebroski | G21C 3/06 376/454 |
| 8,526,566 | B1 * | 9/2013 | Youchison | G21C 21/02 376/412 |
| 8,920,871 | B1 | 12/2014 | Youchison et al. | |
| 10,627,170 | B2 * | 4/2020 | Fioriti | F28F 13/185 |
| 11,270,802 | B1 * | 3/2022 | Reid | F28D 15/0275 |
| 11,424,041 | B2 | 8/2022 | Fisher et al. | |
| 11,731,350 | B2 * | 8/2023 | Salasin | G21C 3/50 264/113 |
| 11,760,005 | B2 * | 9/2023 | Kitchen | B33Y 10/00 264/40.1 |
| 11,817,225 | B2 | 11/2023 | Fisher et al. | |
| 2008/0144762 | A1 | 6/2008 | Holden et al. | |
| 2013/0156143 | A1 * | 6/2013 | Bingham | G21C 15/18 376/298 |
| 2014/0185734 | A1 * | 7/2014 | Petroski | G21C 3/16 376/434 |
| 2018/0226159 | A1 * | 8/2018 | Sterbentz | G21C 3/626 |
| 2019/0096536 | A1 | 3/2019 | Arafat et al. | |
| 2020/0353681 | A1 * | 11/2020 | Fisher | C08K 5/19 |
| 2020/0365290 | A1 * | 11/2020 | Fisher | G21C 3/58 |
| 2020/0373024 | A1 * | 11/2020 | Gramlich | G21C 3/18 |
| 2021/0304909 | A1 * | 9/2021 | Gramlich | G21D 5/02 |
| 2022/0139581 | A1 * | 5/2022 | Dulloo | G21C 15/257 376/100 |
| 2022/0359094 | A1 * | 11/2022 | Petrie | G21C 3/08 |

OTHER PUBLICATIONS

Circle Packing [Online]. Wolfram Research, Inc., Dec. 12, 2023 [retrieved on Jan. 8, 2024]. Retrieved from the Internet: <URL: https://mathworld.wolfram.com/CirclePacking.html>.

Eisemann et al., "Supercritical CO2 Brayton Cycle Design and System Start-Up Options", Barber-Nichols (2011).

Gibson, NASA, Kilopower Press Conference (May 2, 2018).

Graham, et al., "Dense Packings of Congruent Circles in a Circle", Discrete Mathematics, 181 (1998) 139-154.

Greenspan, "Solid-Core Heat-Pipe Nuclear Battery Type Reactor", Technical Report (Sep. 2008). https://doi.org/10.2172/940911.

Heat Pipe Learning Center [Online]. Advanced Cooling Technologies, Inc., 2024 [retrieved on Jan. 8, 2024]. Retrieved from the Internet: <URL: https://www.1-act.com/resources/learning-center/heat-pipes/>.

Hernandez et al., "Micro heat pipe nuclear reactor concepts: Analysis of fuel cycle performance and environmental impacts", Annals of Nuclear Energy, vol. 126 (2019) pp. 419-426.

McClure, et al., "Design of Megawatt Power Level Heat Pipe Reactors", LANL (2015).

Niederauer et al., NASA TM X-52918, "A Split-Core Heat-Pipe Reactor for Space Power Applications" (1970).

Breitwieser et al., NASA TM X-68254, "An Evolutionary Approach for a Compact-Split-Core Reactor" (1973).

NASA-CR-135953, "Heat Pipe Technology: A Bibliography with Abstracts" (1971).

Noall et al., "Achievable Efficiency and Stability of Supercritical CO2 Compression Systems", Sandia/Barber-Nichols (2014).

"Nuclear Reactors and Radioisotopes for Space", Nuclear Reactors for Space—World Nuclear Association (Aug. 2020).

Packomania [Online]. University Magdeburg., Jul. 23, 2023 [retrieved on Jan. 8, 2024]. Retrieved from the Internet: <URL: http://www.packomania.com/>.

Parker, "Applications of heat pipes to nuclear reactor engineering", (1970) Retrospective Theses and Dissertations, 4259. https://lib.dr.iastate.edu/rtd/4259.

Poston, "Nuclear Design of the SAFE-400a Space Fission Reactor", United States, 2002. Web.

Prusinkiewicz, et al., "The Algorithmic Beauty of Plants", Springer-Verlag, 1996.

Sterbentz, et al., "Special Purpose Nuclear Reactor (5 MW) for Reliable Power at Remote Sites Assessment Report", INL/EXT-16-40741 (Apr. 2017). https://doi.org/10.2172/1410224.

Sterbentz, et al., "Preliminary Assessment of Two Alternative Core Design Concepts for the Special Purpose Reactor", INL/EXT-17-43212 (May 2018). https://doi.org/10.2172/1413987.

Sun, et al., "Reactor Core Design and Analysis for a Micronuclear Power Source", Frontiers in Energy Research, vol. 6, Mar. 2018, Article 14 (6 pages). https://doi.org/10.3389/fenrg.2018.00014.

"KRUSTY project demonstrates potential power sources for future space exploration", National Nuclear Security Administration (May 2018). https://www.energy.gov/nnsa/articles/krusty-project-demonstrates-potential-power-sources-future-space-exploration.

International Search Report and Written Opinion dated Oct. 30, 2023, issued in related PCT/US2023/027431.

Extended European Search Report dated Jun. 1, 2026, issued in corresponding European Patent Application No. 23840240.8.

* cited by examiner

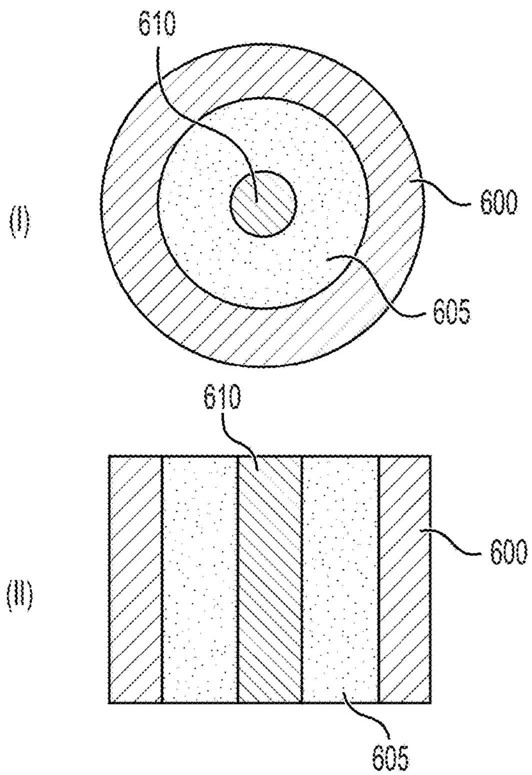
FIG. 12A
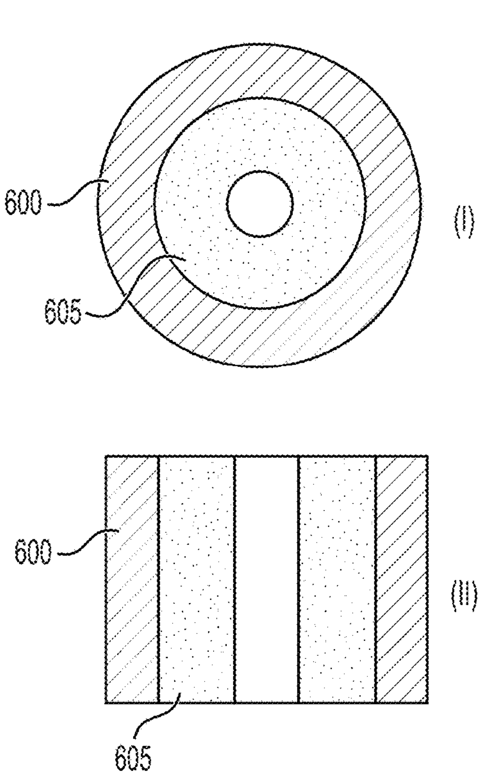
FIG. 12B
| EXAMPLE | INNER REFLECTOR | FUEL | MODERATOR | REFLECTOR | CLADDING | CRITICALITY |
|---|---|---|---|---|---|---|
| 1 | BeO | UO2 | BeO | BeO | SS | 1.170 |
| 2 | NONE | UO2 | BeO | BeO | SS | 1.100 |
| 3 | GRAPHITE | UO2 | BeO | GRAPHITE | SS | 1.064 |
| 4 | NONE | UO2 | BeO | GRAPHITE | SS | 1.002 |
| 5 | NONE | UO2 | NONE | BeO | SS | 1.077 |
| 6 | BeO | UO2 | BeO | BeO | Mo | 1.120 |
| 7 | BeO | U10Mo | BeO | BeO | Mo | 1.206 |
FIG. 12C

HEAT PIPE FUEL ELEMENT AND FISSION REACTOR INCORPORATING SAME, PARTICULARLY HAVING PHYLLOTAXIS SPACING PATTERN OF HEAT PIPE FUEL ELEMENTS, AND METHOD OF MANUFACTURE

RELATED APPLICATION DATA

The application is based on and claims priority under 35 U.S.C. § 119 to U.S. Provisional Application No. 63/388,324, filed Jul. 12, 2022, the entire contents of which are incorporated herein by reference.

TECHNICAL FIELD AND INDUSTRIAL APPLICABILITY

The disclosure relates generally to fission reactors, either a fast spectrum reactor or a thermal reactor, in which the fuel elements are heat pipes with cladding walls enclosing fuel bodies formed of a fissionable fuel composition and where surfaces of the fuel body are in direct contact with primary coolant. Circulation of the primary coolant in the heat pipe removes heat generated by the fission reactor and supplies heat to a heat sink, which can be used for work.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Heat pipes are passive, two-phase systems that efficiently move heat, or thermal energy, from one point to another. Conventional heat pipes consist of a working fluid, a wick structure, and a vacuum-tight containment unit (envelope). Typically, the heat pipe is cylindrical in cross-section, with the wick on the inner diameter surface. Cool working fluid moves through the wick by capillary action from the colder side (condenser) to the hotter side (evaporator). In the evaporator section, heat input vaporizes the working fluid in liquid form at the wick surface. This vapor then moves to the condenser's heat sink, bringing thermal energy along with it. In the condenser, the working fluid condenses, releasing its latent heat. The cycle then repeats to continuously remove heat from part of the system. The phase-change processes and the two-phase flow circulation in the heat pipe will continue as long as there is a large enough temperature difference between the evaporator and condenser sections. The fluid stops moving if the overall temperature is uniform, but starts back up again as soon as a temperature difference exists. No power source (other than heat) is needed.

Examples of applications for heat pipes include cooling of electronics, HVAC systems, and thermal control of satellites and spacecraft. One specific example application is NASA's safe affordable fission engine (SAFE), which was an experimental nuclear fission reactor for electricity production in space. SAFE-400 used rhenium-clad uranium nitride fuel surrounded by a molybdenum-sodium heat pipe that transports heat to a heat pipe-gas heat exchanger (see Poston, David I. *Nuclear Design of the SAFE-*400*a Space Fission Reactor*. United States: N. p., 2002. Web). Another specific example application is the Special Purpose Reactor (SPR), which is a small 5 MWt, heat pipe-cooled, fast reactor (see https://www.osti.gov/servlets/purl/1413987). A further specific example is NASA's Kilopower project, KRUSTY (Kilowatt Reactor using Stirling Technology), which is a prototype fission reactor coupled with heat pipes to Stirling engines.

Despite the existence of various heat pipes in reactor designs, there is still room for improved designs, especially applying heat pipe structures and concepts to fission reactors.

SUMMARY

Heat pipe applications in fission reactors couple the evaporator section of the heat pipe structure to the heat generating reactor structure and couple the condenser section of the heat pipe structure to a heat sink structure, such as a heat exchanger. In contrast to current heat pipe reactors, which rely on some thermal conductor between the fuel and the heat pipe, e.g., a thermal conductor in the form of the structural wall of the heat pipe, the disclosed heat pipe reactor utilizes fuel bodies formed of a fissionable fuel composition that are interior to the structural wall of the heat pipe. The structural wall of the heat pipe functions as a cladding wall enclosing the fuel body and inner surfaces of the fuel body are shaped so that the fuel body itself is the heat pipe structure in the evaporation section. In some embodiments, the fuel body is in direct contact with primary coolant circulating in the interior of the heat pipe, while in other embodiments the fuel body is separated from the primary coolant circulating in the interior of the heat pipe by an inner cladding wall. Thus, heat transfer from the fuel body to the primary coolant is more efficient, for example, in eliminating thermal resistances in the heat pipe structure by unifying the fuel and heat pipe into one singular nuclear heat producing element.

Each heat pipe with fuel body forms an individual heat pipe fuel element and additional aspects of the disclosed heat pipe fission reactor include (i) the fuel body in each heat pipe fuel element having a structure with a shape corresponding to a mathematically-based periodic solid and (ii) the evaporation sections of a plurality of heat pipe fuel elements being arranged in a phyllotaxis pattern (as seen in a cross-section in a plane perpendicular to a longitudinal axis of the active core region).

Exemplary embodiments of a heat pipe fuel element, includes an evaporation section, a condensing section, a capillary section connecting the evaporation section to the condensing section, and a primary coolant. In the evaporation section and in a cross-section in a plane perpendicular to a longitudinal axis of the evaporation section, the heat pipe fuel element includes a cladding layer enclosing an interior area including a fuel body formed of a fissionable fuel composition and that has an outer surface oriented toward the cladding layer and an inner surface defining a periphery of a vaporization space of the evaporation section.

In exemplary embodiments, a plurality of heat pipe fuel is incorporated into a fission reactor structure in which at least a portion of the evaporation section of each heat pipe fuel is contained within an active core region of the fission reactor and at least a portion of the condensing section of each heat pipe fuel is contained within a heat sink structure. The capillary section of each heat pipe fuel element traverses the space between the active core region and the heat sink structure.

By the disclosed design, large amounts of thermal conductance structure (typically included in conventional designs) can be removed and the size of the void space in the reactor can be reduced, leading to lighter weight, more transportable cores. In addition, integrating heat pipe fuel elements into the design of the active core region of a fission reactor system allows for the heat removal section to be implemented as a separate structure, which decouples an inherent design problem most conventional reactors face when designing an optimal system. Also, removal of the thermal conductance structure can be an advantage neutronically, as fuel is replacing metal in the core.

Other aspects of the disclosed fission reactor system with heat pipe fuel elements includes: (i) use of much larger heat exchangers in the overall reactor design, (ii) use of alternate working fluids that are not suitable or desirable for use in a reactor due to material concerns, and (iii) use of larger, split heat pipe heat exchangers, which allow application of flow optimization techniques for high heat transfer (turbulation vs. tribulation features, gyroid flow paths, etc.), but would otherwise be neutronically undesirable or not achievable in a traditional reactor design. For example, the condenser section of the heat pipe section can be larger as compared to the evaporation region of the heat pipe directly in the reactor, and the larger evaporation space afforded by heat pipe designs allows for Intermediate Heat Exchanger (IHX) designs to exist that would otherwise add too much gas volume directly in the core for criticality to exist. Also for example, certain material concerns, such as activation, corrosion of the fuel elements, scarcity of the working fluid, etc., are overcome by the use of the disclosed heat pipe fuel elements. For instance, $N_2$ is much worse than He thermally, but it is easier to ensure supply of $N_2$ and designing a gas cooled $N_2$ reactor is much harder than reactor using He. However using a heat pipe reactor enables a $N_2$ reactor by displacing the poor thermal conductivity to a IHX outside the reactor itself, which can be designed for optimal $N_2$ heat transfer and can ignore reactivity concerns.

Still further aspects of the disclosed fission reactor system with heat pipe fuel elements includes: (a) use of continuous tube cladding through at least the active core region, which can eliminate irradiated welds, (b) tighter packing factors provided by phyllotaxis design, which enables smaller active core regions with less wasted fissionable fuel, e.g., uranium, and which enhances high-assay low-enriched uranium (HALEU) design capabilities, (c) local, per heat pipe fuel element control of fissionable fuel density, which allows for limiting peaking factors throughout the active core region (such as by changing the parameters of a triply periodic minimal surface (TPMS) defining a functionally graded lattice fuel structure, as disclosed in U.S. patent application Ser. No. 16/835,388, the entire contents of which are incorporated herein by reference) and (d) ability to integrate moderator materials in the design of the heat pipe fuel element allows for a thermal reactor design (versus a fast spectrum reactor).

In addition, the disclosed heat pipe fuel element can be manufactured using an additive manufacturing processes. Examples of suitable additive manufacturing processes are disclosed in ISO/ASTM52900-15, which defines categories of additive manufacturing processes, including: binder jetting, directed energy deposition, material extrusion, material jetting, powder bed fusion, sheet lamination, and photopolymerization. The contents of ISO/ASTM52900-15 are incorporated herein by reference. Also, compositions for additive manufacturing processes and methods of additive manufacturing are disclosed in U.S. patent application Ser. No. 16/835,370, the entire contents of which are incorporated herein by reference, and methods of additive manufacturing and to in-situ monitor production of additive manufacturing products are disclosed in U.S. patent application Ser. No. 16/951,543, the entire contents of which are incorporated herein by reference.

It is to be understood that both the foregoing general description and the following detailed description are exemplary and explanatory and are intended to provide further explanation of the disclosure as claimed. Additional features and advantages will be set forth in the description that follows, and in part will be apparent from the description, or may be learned by practice of the disclosure. The objectives and other advantages disclosed herein will be realized and attained by the structure particularly pointed out in the written description and claims thereof, as well as the appended drawings.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

FIGS. 12A and B schematically illustrate two simulation structures used in Monte-Carlo N-Particle (MCNP) simulations and FIG. 12C is a table showing details on variables used in the simulation of seven examples.

Figure 1:
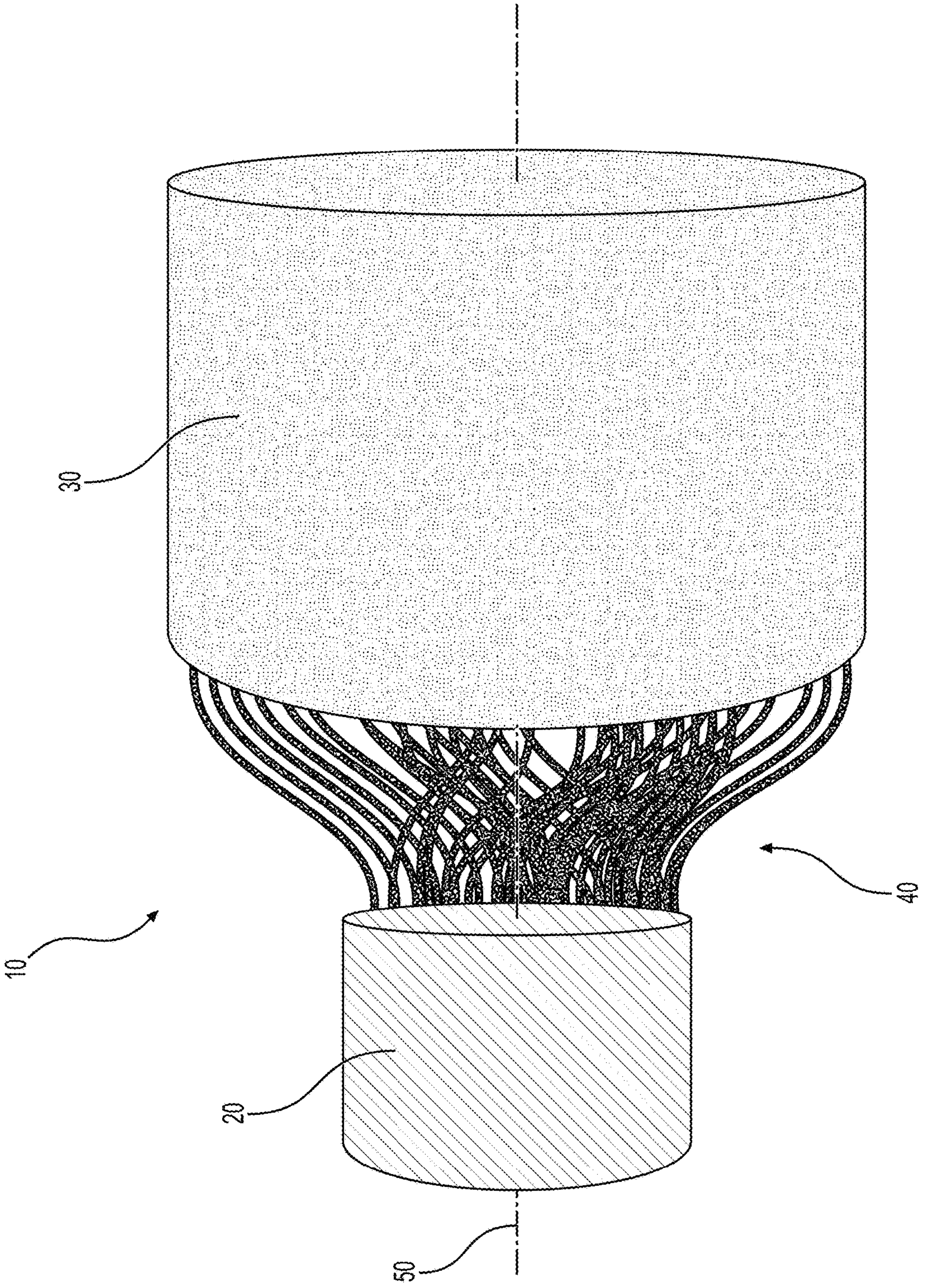
FIG. 1 is a simplified schematic perspective view of a fission reactor system showing a fission reactor coupled to a heat exchanger by a plurality of heat pipes including heat pipe fuel elements.

For ease of viewing, in some instances only some of the named features in the figures are labeled with reference numerals.

DETAILED DESCRIPTION

FIG. 1 is a simplified schematic perspective view of a fission reactor system. The fission reactor system 10 includes a fission reactor 20 coupled to a heat sink structure 30, such as a heat exchanger, a gas generator, or an engine (for example, a Stirling engine), by a plurality of heat pipe fuel elements 40. Each heat pipe fuel element 40 includes a structural wall enclosing an interior volume that includes an evaporation section, a condensing section, and a capillary section of a heat pipe. At least a portion of the evaporation section of each heat pipe fuel element 40, such as a majority portion or an entire portion, is located in the fission reactor 20 and includes a fuel body formed of a fissionable fuel composition that is interior to the structural wall of the heat pipe fuel element 40. At least a portion of the condensing section of each heat pipe fuel element 40, such as a majority portion or an entire portion, is located in the heat sink structure 30 and is also interior to the structural wall of the heat pipe fuel element 40. In each heat pipe fuel element 40, a capillary section connects the respective evaporation section to the condensing section. Where the fission reactor 20 and the heat sink structure 30 are spatially separated, the capillary section of each heat pipe fuel element 40 can traverse a space between the active core region of the fission reactor 20 and the heat sink structure 30. The structural wall of the heat pipe fuel element 40 functions as a cladding layer for the heat pipe fuel element 40 and is vacuum tight. In heat pipe embodiments, a wick structure is in contact with at least portions of the interior surface of the structural wall and is saturated with a working fluid.

Figure 2A:
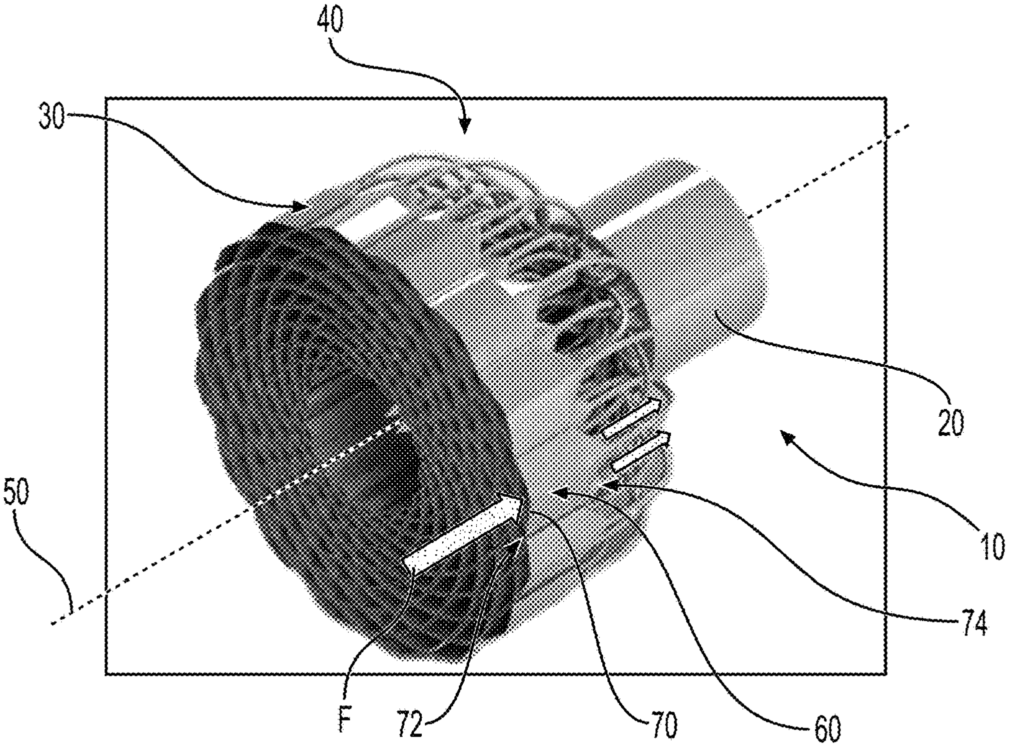
FIGS. 2A and 2B show perspective (FIG. 2A) and end (FIG. 2B) views of an embodiment of a fission reactor system in which a fission reactor is coupled to a heat exchanger by a plurality of heat pipes including heat pipe fuel elements.
Figure 2B:
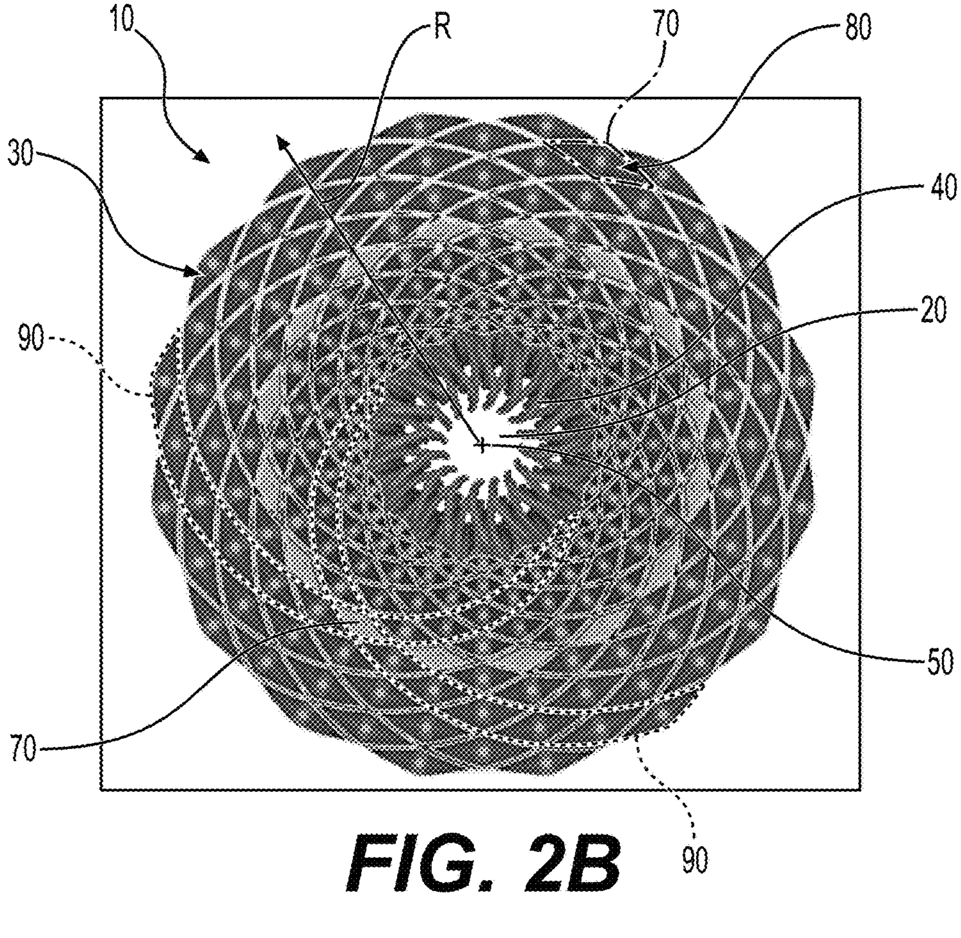

FIG. 2A shows a perspective view of an embodiment of a fission reactor system showing the fission reactor 20, heat pipe fuel elements 40, and heat sink structure 30 arranged in sequence along a longitudinal axis 50 of the fission reactor system 10. The heat sink structure 30 is radially larger than the fission reactor 20. As shown in FIG. 2B, which is an end view along longitudinal axis 50 as seen from the heat sink structure 30 end of the fission reactor system 10, the radial dimension of the heat sink structure 30 is represented by radius R, which extends in the radial direction from the longitudinal axis 50 to the radially outermost surface of the heat sink structure 30. The radial dimension of the heat sink structure 30 is sized so as to contain a region 60 in the condensing section of each of the heat pipe fuel elements 40 in which the structural wall 70 has an increased surface area. The increased surface area of the structural wall 70 in region 60 is relative to the surface area of the structural wall in the capillary section and the evaporation section. In example embodiments, the increased surface area of the structural wall 70 in region 60 is 2-5 times the surface area of the structural wall in the capillary section and the evaporation section. The high surface area of the structural wall 70 in region 60 promotes efficient heat exchange between the condensing section and the medium (liquid or gas) in contact with the exterior surfaces of the structural wall 70 in region 60.

In the embodiment shown in FIGS. 2A and 2B, a first portion of the structural wall 70 in region 60 has been formed into fins defining a periphery of an open space 80 and a second portion of the structural wall 70 is located within the open space 80 and is the cladding layer enclosing the condensing section (the second portion is more readily seen in FIG. 2B). The open space 80 provides a flow path for a cooling medium, such as a gas or a liquid. An example flow path is shown in FIG. 2A by arrows F and extends longitudinally from an entrance end 72 to an exit end 74 of the region 60, although other flow paths may also be implemented. With the noted structural arrangement, heat exchange can occur via both the first portion and the second portion of the structural wall 80. In particular, two surfaces of the fins, i.e., the inner surface and the outer surface, function as heat exchange surfaces and an exterior surface of the cladding layer in the second portion also functions as a heat exchange surface.

The regions 60 in which the structural wall 70 has an increased surface area can be integrally formed with the cladding layer enclosing the condensing section or the regions 60 in which the structural wall 70 has an increased surface area can be formed separately and attached to the cladding layer enclosing the condensing section. In both instances, the regions 60 in which the structural wall 70 has an increased surface area provides a thermal conduction path for heat removal from the condensing section.

some embodiments, the high surface area structure, such as the shown fins, associated with any one heat pipe fuel element 40 can be arranged in a phyllotaxis pattern, which allows for a dense packing pattern with rhomboid objects of a similar size throughout the phyllotaxis pattern. In FIG. 2B, the phyllotaxis pattern is embodied by a plurality of intersecting, oppositely spiraling, radiating arms 90, the intersections of which form a rhomboidal-shaped structural wall 70.

As seen, for example, in FIG. 2A, the capillary section of each heat pipe fuel element 40 connects the respective evaporation section (located in the fission reactor 20) to the condensing section (located in the heat sink structure 30). In this embodiment, because the heat sink structure 30 is volumetrically larger than the fission reactor 20, the capillary section has a transitional shape to connect the volumetrically mismatched heat sink structure 30 and fission reactor 20. In one aspect, this results in the capillary sections being spaced apart in the portion near to and connecting to the heat sink structure 30 and the capillary sections transitioning to a more closed-packed arrangement in the portion near to and connecting to the fission reactor 20. The transitional shape and rate of transition, such as bendedly-shaped or with one more sections of constant slope, can correspond to a shape that promotes the flow of vapor and liquid internal to the heat pipe fuel element 40.

Figures 3A, 3B, 3C:
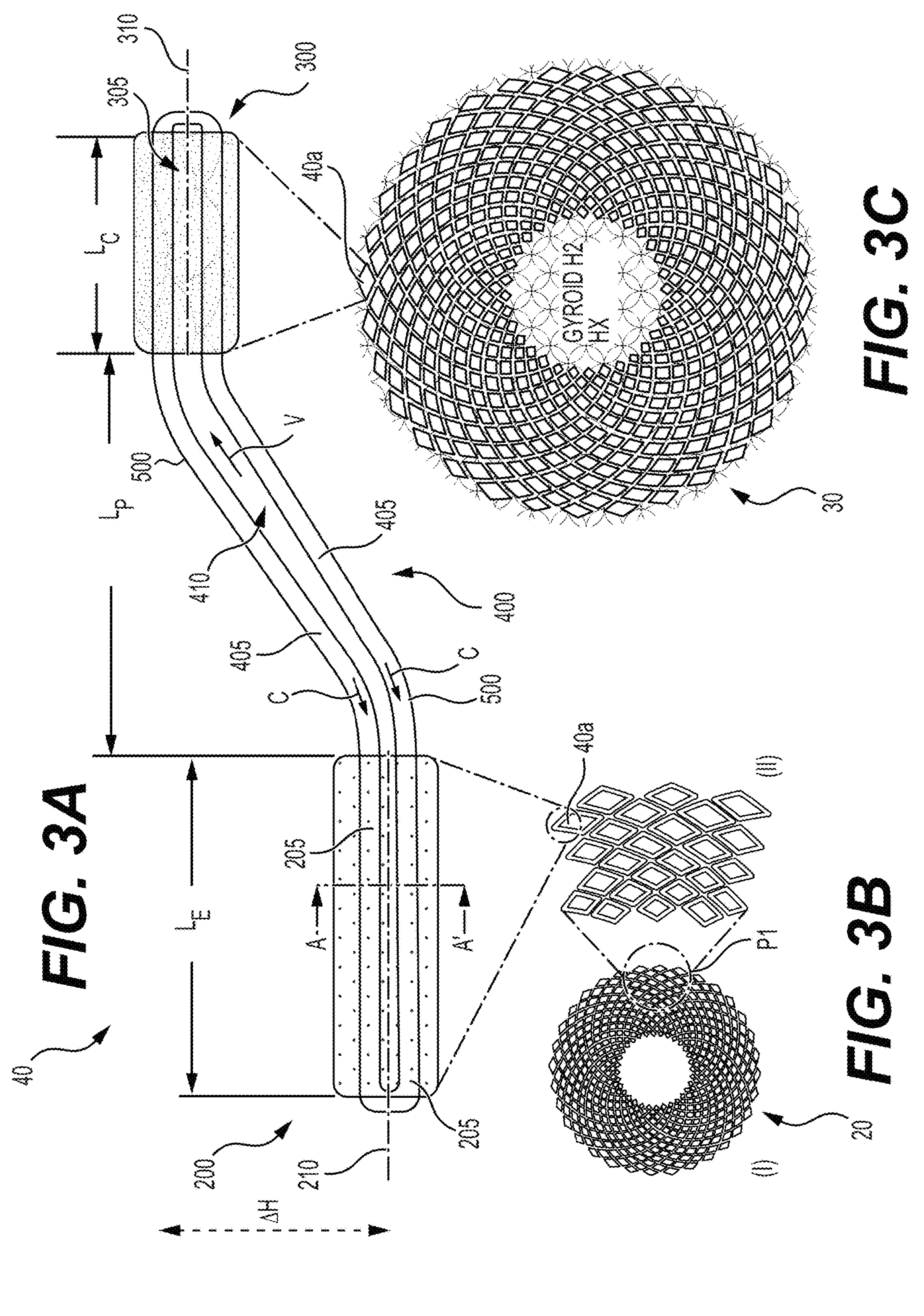
FIG. 3A is a simplified schematic cross-sectional view of an individual heat pipe fuel element and also illustrates example locations of sections of the heat pipe fuel element relative to components of a fission reactor system, including a fission reactor and heat exchanger.
FIG. 3B shows an individual heat pipe fuel element in the context of a phyllotaxis pattern of heat pipe fuel elements in the active core region of the fission reactor and FIG. 3C shows an individual heat pipe fuel element in the context of a phyllotaxis pattern of heat pipe fuel elements in a heat sink structure.

FIG. 3A is a simplified schematic cross-sectional view of an individual heat pipe fuel element 40. The heat pipe fuel element 40 includes an evaporation section 200 at a first end, a condensing section 300 at a second end, and a capillary section 400 connecting the evaporation section 200 and the condensing section 300. The heat pipe fuel element has a structural wall 500 that functions as a cladding layer enclosing the entire volume of the heat pipe fuel element 40. The evaporation section 200 has a length $L_E$ and the cladding layer in the evaporation section 200 encloses a fuel body 205 that is formed of a fissionable fuel composition. The capillary section 400 has a length $L_P$ and the cladding layer in the capillary section 400 encloses a wick structure 405 and a vapor space 410. The condensing section 300 has a length $L_C$ and the cladding layer in the capillary condensing section 300 encloses a condensing space 305. In some embodiments, the wick structure 405 extends into at least a portion of the condensing section 300, alternatively an entire portion of the condensing section 300.

A working fluid is contained within the heat pipe fuel element 40. In embodiments in which the heat pipe fuel element 40 is incorporated into a fission reactor system, the working fluid takes the form of the primary coolant for the fuel body 205 formed of a fissionable fuel composition. An example working fluid suitable for a primary coolant is sodium-potassium alloy, which has excellent heat transfer properties as well as is liquid metal at room temperature. Other example working fluids include other liquid metals, such as sodium, potassium, and alloys thereof. In certain embodiments, the heat pipe material is Inconel 600/790 or Haynes 230.

The structure of the heat pipe fuel element 40 supports closed-loop circulation of the working fluid. Working fluid contained within the heat pipe fuel element 40 forms vapor in the evaporation section 200, which corresponds to the heated end of the heat pipe fuel element 40. The vapor moves through the vapor space 410 of the capillary section 400 toward the condensing section 300 (vapor movement being represented by arrow V in FIG. 3A), where the vapor condenses in the condensing space 305 to form a liquid, depositing its heat of vaporization with a small attendant temperature change. The condensed working fluid is returned to the evaporation section 200 using a wick structure 405, which exerts a capillary action on the liquid phase of the working fluid. Capillary action between the liquid phase of the working fluid and the wick structure 405 draws the condensate from the condensing section 300, back through the capillary section 400, and toward the evaporation section 200 (condensate movement being represented by arrow C in FIG. 3A). In some embodiments, gravity can be combined with capillary action to effect return of the condensed working fluid to the evaporation section 200. For example, the evaporation section 200 and condensing section 300 can be at different elevations or have a separation distance so that condensing section 300 can be at a position above the evaporation section 200. FIG. 3A illustrates an example of a height difference ΔH between longitudinal axes of the evaporation section 200 and condensing section 300 (designated 210 and 310, respectively).

Examples of wick structures include sintered metal powder, screen, and axially-grooved structures. In exemplary embodiments of the heat pipe fuel element 40, the wick structure 405 is a mesh of sintered metal and the mesh has the geometric form of a triply periodic minimal surfaces (TPMS).

The evaporation section 200 of a plurality of heat pipe fuel elements 40 can be arranged within a fission reactor 20. FIG. 3B illustrates an example of such an arrangement. The heat pipe fuel element 40 shown in cross-sectional side view in FIG. 3A is positioned within a phyllotaxis pattern, shown in end view in part (I) of FIG. 3B and in a magnified view of section P1 in part (II). The individual heat pipe fuel element 40 shown in cross-sectional side view in FIG. 3A is designated 40*a* in part (II) of FIG. 3B.

The condensing section 300 of a plurality of heat pipe fuel elements 40 can be arranged within a heat sink structure 30. FIG. 3C illustrates an example of such an arrangement. The heat pipe fuel element 40 shown in cross-sectional side view in FIG. 3A is positioned within a phyllotaxis pattern, shown in end view in FIG. 3C. The individual heat pipe fuel element 40 shown in cross-sectional side view in FIG. 3A is designated 40*a* in FIG. 3C.

Figure 4C:
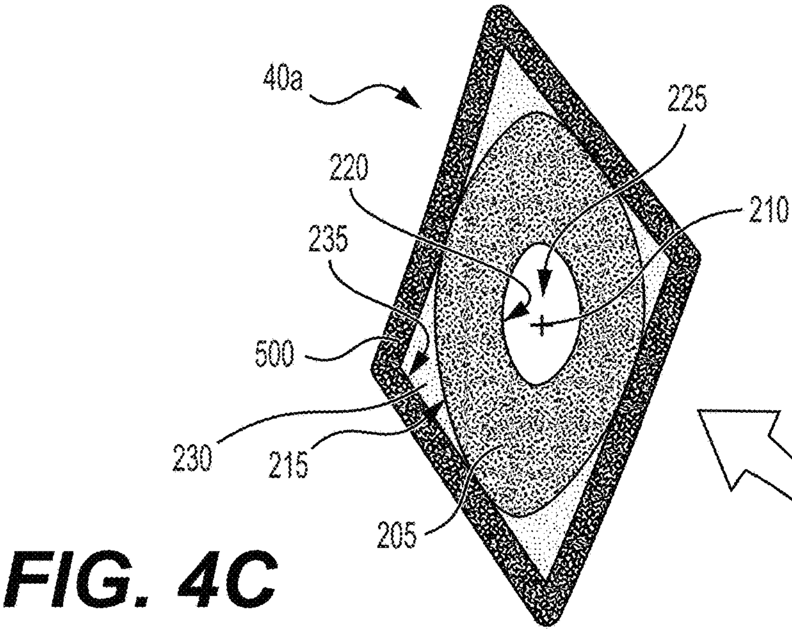
FIGS. 4C to 4E are schematic representations of different embodiments of a cross-section of a heat pipe fuel element as seen along section A-A' in FIG. 3A and showing the interior features.
Figure 4A:
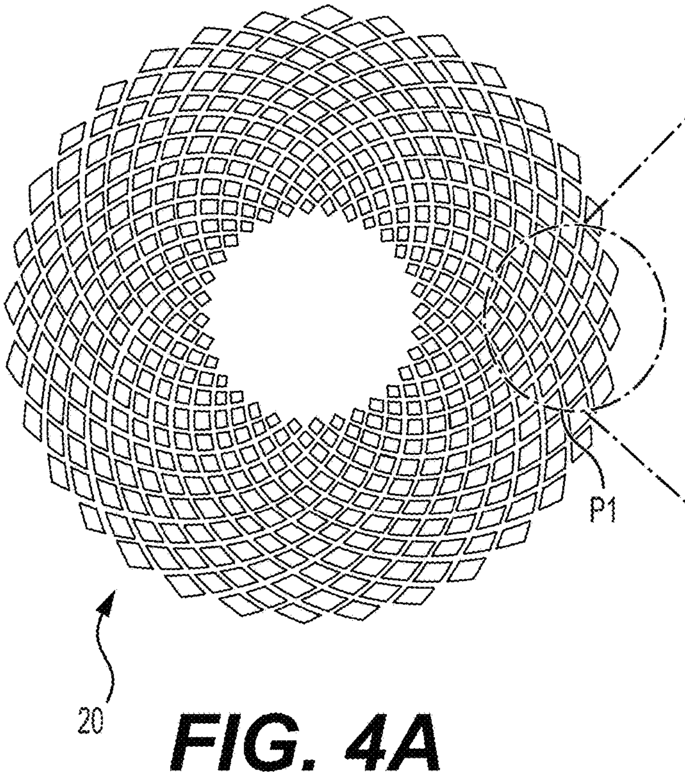
FIG. 4A schematically illustrates details of the arrangement of an individual heat pipe fuel element and FIG. 4B shows an example arrangement of the evaporation section of a plurality of heat pipe fuel elements in a fission reactor.
Figure 4B:
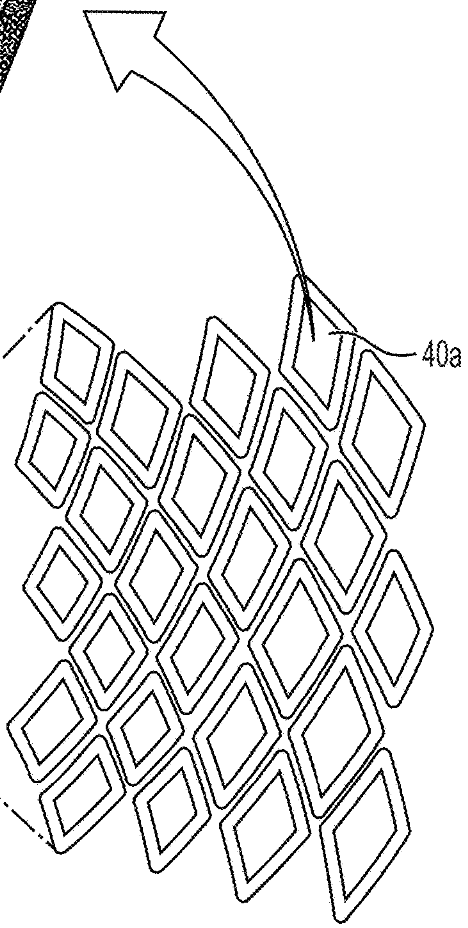

FIG. 4C schematically illustrates a cross-section of the heat pipe fuel element 40 in a plane perpendicular to the longitudinal axis 210 of the evaporation section 200 taken along section A-A' in FIG. 3A. For reference, the cross-section shown in FIG. 4C is for the heat pipe fuel element designated 40*a* in FIG. 4B, which is a magnified view of section P1 from FIG. 4A, which shows the evaporation section 200 of a plurality of heat pipe fuel elements 40 arranged within a fission reactor 20 in a phyllotaxis pattern. FIGS. 4A and 4B are similar to part (I) and part (II) in FIG. 3B. As seen in the cross-sectional view in FIG. 4C, the structural wall 500 of the heat pipe fuel element 40*a*, i.e., a cladding layer, encloses an interior area that includes a fuel body 205. The fuel body 205 has an outer surface 215 oriented toward the cladding layer and an inner surface 220 defining a periphery of a vaporization space 225 of the evaporation section 200. Working fluid is in direct contact with the surfaces of the vaporization space 225.

Figure 4D:
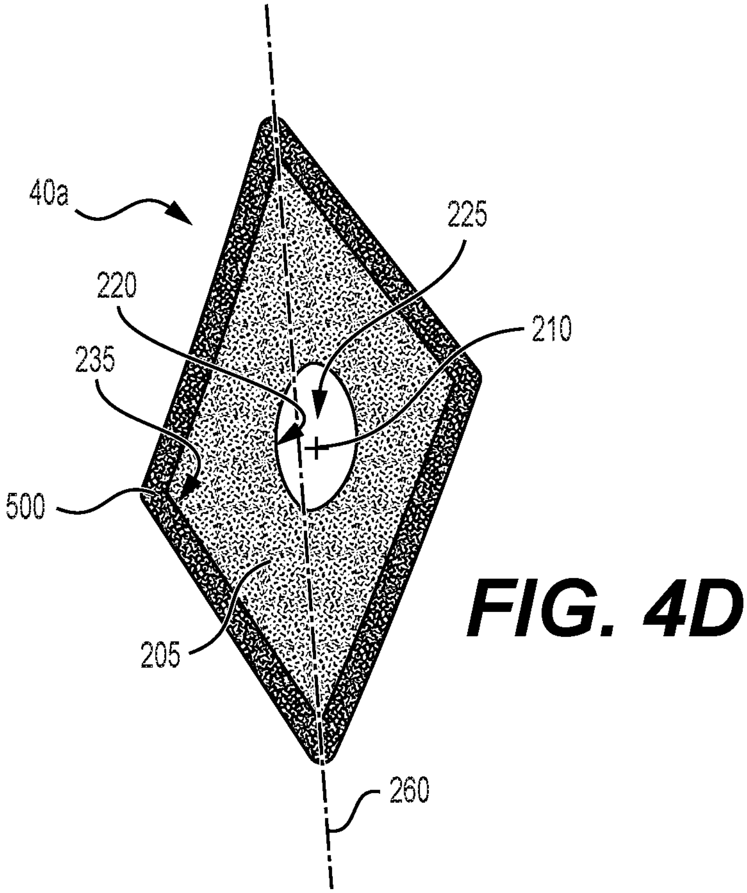
Figure 4E:
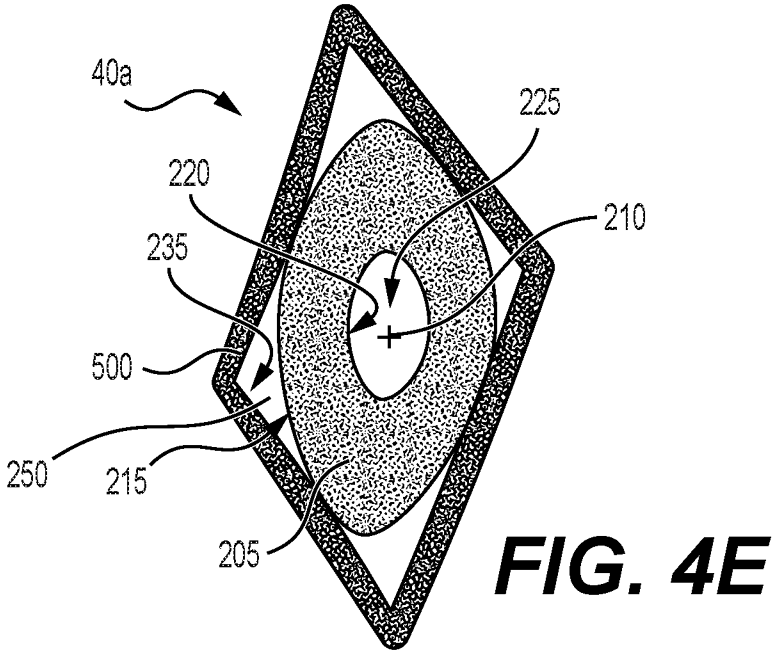

In some embodiments and as shown in FIG. 4C, the interior area enclosed by the structural wall 500 of the heat pipe fuel element 40*a*, i.e., a cladding layer, further includes a moderator 230 between the outer surface 215 of the fuel body 205 and an interior surface 235 of the structural wall 500. When a moderator 230 is included, the neutronics of the heat pipe fuel element 40*a* are such that a fission reactor system including such heat pipe fuel elements 40*a* is a fast spectrum reactor. In other embodiments and as shown in FIG. 4D, a moderator is not present within the interior area enclosed by the structural wall 500, in which case the neutronics of the heat pipe fuel element 40*a* are such that a fission reactor system including such heat pipe fuel elements 40*a* is a thermal reactor. When a moderator is not present, the outer surface 215 of the fuel body 205 can be in contact with the interior surface 235 of the structural wall 500. In some embodiments and as shown in FIG. 4D, there is no gap between the outer surface 215 of the fuel body 205 and the interior surface 235 of the structural wall 500 and the fuel body 205 occupies all of the interior area enclosed by the structural wall 500 of the heat pipe fuel element 40*a*, i.e., a cladding layer, but for the vaporization space 225. In other embodiments and as shown in FIG. 4E, there is a gap 250 between at least a portion of the outer surface 215 of the fuel body 205 and the interior surface 235 of the structural wall 500. This gap 250 can function as a secondary vaporization space of the evaporation section 200.

The cross-sectional shape of the heat pipe fuel element 40*a* is not particularly limited. In example embodiments, in the evaporation section 200 and in the cross-section in the plane perpendicular to the longitudinal axis 210 of the evaporation section 200, the structural wall 500 of the heat pipe fuel element 40*a*, i.e., the cladding layer, enclosing the interior area has a shape of a polygon. Example polygon shapes include a quadrilateral, a rhombus or a rhomboid. In some aspects, the quadrilateral is skewed, meaning the quadrilateral is non-symmetric across a plane of symmetry. An example plane of symmetry 260 is shown in FIG. 4D and runs between opposite vertices of the structural wall 500. Generally, the cross-sectional shape of the heat pipe fuel element 40*a* will depend upon the arrangement of the heat pipe fuel element 40*a*, such as in a phyllotaxis pattern, and location of that heat pipe fuel element 40 within that arrangement.

In some embodiments, the cladding layer forms the exterior wall of the heat pipe fuel element 40 along its entire length. In other embodiments, the cladding layer forms at least a portion of an exterior wall of the heat pipe fuel element 40*a*, such as the portion corresponding to the evaporation section 200. In some embodiments, the cladding layer is a seamless continuous tube. This is particularly preferred in the evaporation section 200 of the heat pipe fuel element 40*a*. At least in the evaporation section 200 and alternatively along the entire length of the heat pipe fuel element 40*a*, example compositions of the structural wall 500 of the heat pipe fuel element 40*a* include aluminum alloy or zirconium alloy, as suitable for the anticipated reactor temperatures. In some embodiments, the structural wall 500 is the same material, but the cooling lattice structure on the condenser section that transfers heat to the heat exchanger gasses can be a different material, such as Al to reduce weight.

In the various embodiments, the fuel body 205 is formed of a fissionable fuel composition, typically including a uranium-containing material, preferably uranium nitride, uranium oxide, uranium carbide, or a cermet thereof. Specific examples of fissionable fuel compositions include high-assay low-enriched uranium (HALEU) with a U-235 assay equal to or greater than 5 percent and equal to or lower than 20 percent or highly enriched uranium (HEU) with 20% or more U-235. Other examples include U10Mo (uranium with 10 weight percent molybdenum) and UN.

The fuel body 205 can have any suitable structure. In one embodiment, the fuel body 205 is extruded from powders containing the fuel composition to form cylinder bodies with an annulus-shaped cross-section, which is then sintered and inserted into the evaporation section of the heat pipe fuel element. In another embodiment, the powders containing the fuel composition are supplied to additive manufacturing equipment, for example as powders or as components in a slurry, and a fuel body 205 having a structure with a shape corresponding to a mathematically-based periodic solid is manufactured using additive manufacturing processes. Examples of nuclear slurries and additive manufacturing of nuclear components using nuclear slurries are disclosed in U.S. application Ser. No. 16/835,370, the entire contents of which are incorporated herein by reference. Examples of mathematically-based periodic solids, include triply periodic minimal surfaces (TPMS), Schwarz minimal surfaces, gyroid structures, and lattice structures, and examples are disclosed in U.S. application Ser. No. 16/835,388, the entire contents of which are incorporated herein by reference.

In some embodiments and as shown in FIG. 4D, there is no gap between the outer surface 215 of the fuel body 205 and the interior surface 235 of the structural wall 500 and the fuel body 205 occupies all of the interior area enclosed by the structural wall 500 of the heat pipe fuel element 40*a*, i.e., a cladding layer, but for the vaporization space 225. In other embodiments and as shown in FIG. 4E, there is a gap 250 between at least a portion of the outer surface 215 of the fuel body 205 and the interior surface 235 of the structural wall 500. This gap 250 can function as a secondary vaporization space of the evaporation section 200.

Figure 5:
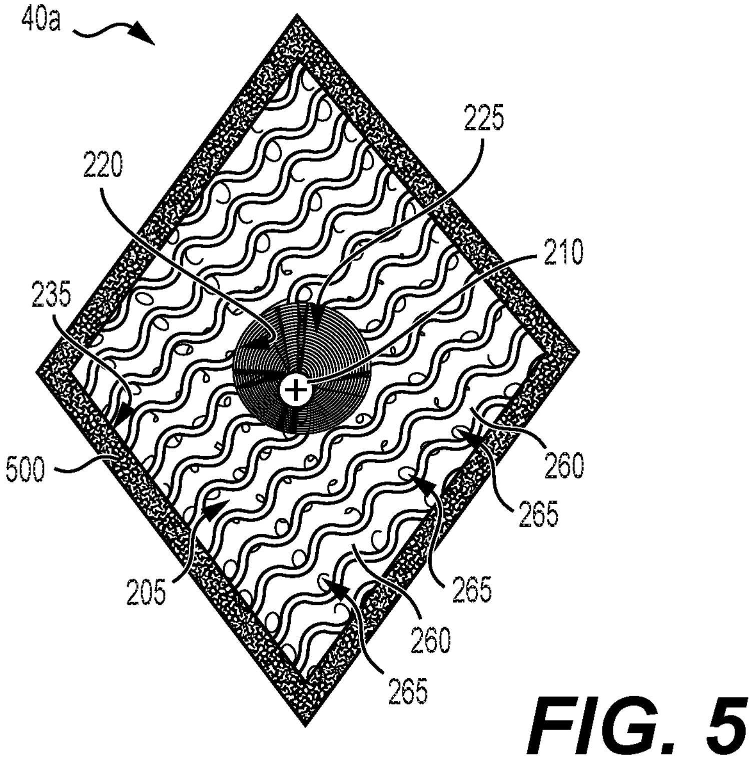
FIG. 5 depicts (in magnified view) an embodiment of a cross-section of a heat pipe fuel element in which the fuel body has a gyroid structure (shown in Cartesian coordinates).
Figure 6:
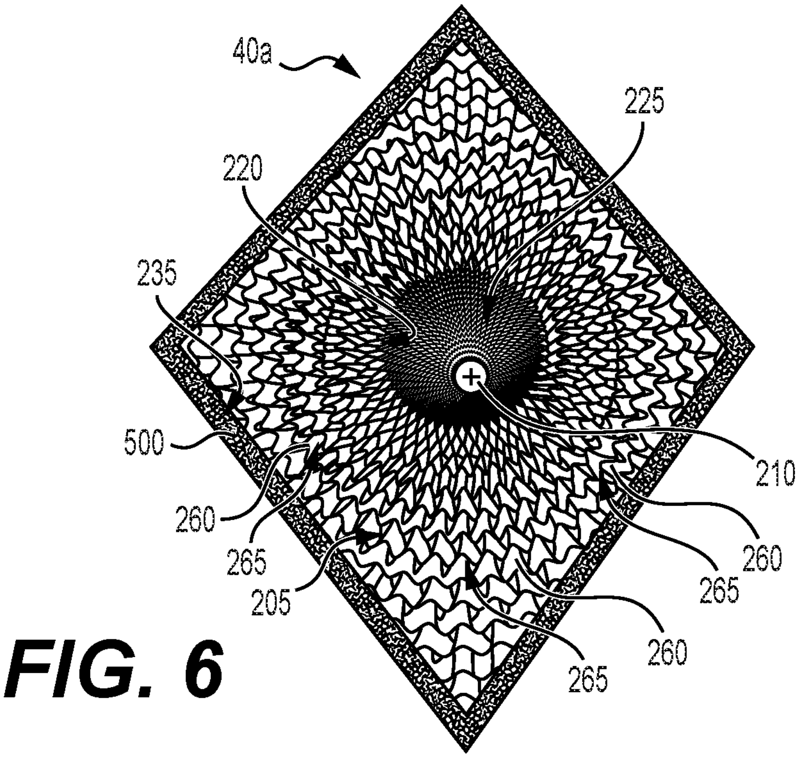
FIG. 6 depicts (in magnified view) an embodiment of a cross-section of a heat pipe fuel element in which the fuel body has a gyroid structure (shown in cylindrical coordinates).

FIG. 5 depicts (in magnified view) an embodiment of a cross-section of a heat pipe fuel element 40*a* in which the fuel body 205 has a gyroid structure (shown in Cartesian coordinates) and FIG. 6 depicts (in magnified view) an embodiment of a cross-section of a heat pipe fuel element 40*a* in which the fuel body 205 has a gyroid structure (shown in cylindrical coordinates). In both FIGS. 5 and 6, the magnified view is looking down the general direction of the axis 210 of the evaporation section 200. Both FIGS. 5 and 6 show surfaces 260 of the gyroid structure, which define a plurality of channels 265 in the fuel body 205. While the surfaces 260 follow the form as defined by the mathematically-based periodic solid or variations thereof) at least a portion of the channels 265 formed by the surfaces 260 extend from a first location on the outer surface 215 of the body 205 to a second location on the outer surface 215 of the body 205. At least a portion of the channels 265, alternatively a majority of the channels 265 and further alternatively all of the channels 265, provide a path through the body 205 for the working fluid.

In a fuel body 205 in the form of a mathematically-based periodic solid, the composition of the structure of the fuel body 205 includes a nuclear fissionable fuel and the structure of the fuel body 205 is such that the structure has a volumetric density of 35% to 85%. For example, the fissionable fuel composition can include a nuclear fissionable fuel having an enrichment of up to 20%, and wherein a specific enrichment of the fuel body (% enrichment per unit volume) is constant±2%.

In various alternative embodiments in which the fuel body 205 is in the form of a mathematically-based periodic solid, the volumetric density of the fuel body 205 is equal to or greater than 40%, 45%, 50%, or 55% and is equal to or less than 80%, 75%, 70%, or 65%, or the volumetric density is 60±10%. The volumetric density is determined by considering the amount of solid material in a unit volume of the fuel body 205 relative to the total volume of that unit volume, which includes both the solid material and the open spaces (i.e., the channels 265). Furthermore, in these embodiments, the open spaces, i.e., the channels 265, form part of the vaporization space 225 and working fluid is in direct contact with the surfaces of the vaporization space 225.

In optional embodiments, the inner surface 220 of the fuel body 205 can have a cladding to protect against erosion and wear by the working fluid. Where the fuel body 205 has a structure with a shape corresponding to a mathematically-based periodic solid, the surfaces of the plurality of channels defined by surfaces of the mathematically-based periodic solid can also have a cladding. Such cladding can be formed by, for example, vapor deposition techniques, electroplating, etc. In one exemplary embodiment, a thin layer of Mo or W or NbC can be applied by physical vapor deposition (PVD) to form a layer to prevent lifetime fuel damage.

Figure 7:
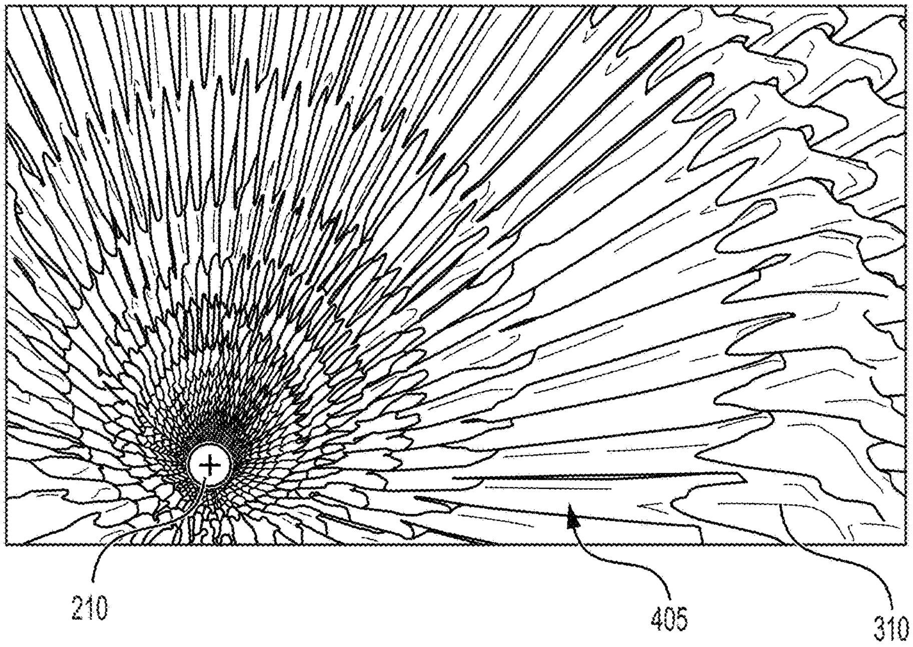
FIG. 7 depicts (in magnified view) an embodiment of an evaporation section of a heat pipe fuel element.
Figure 8:
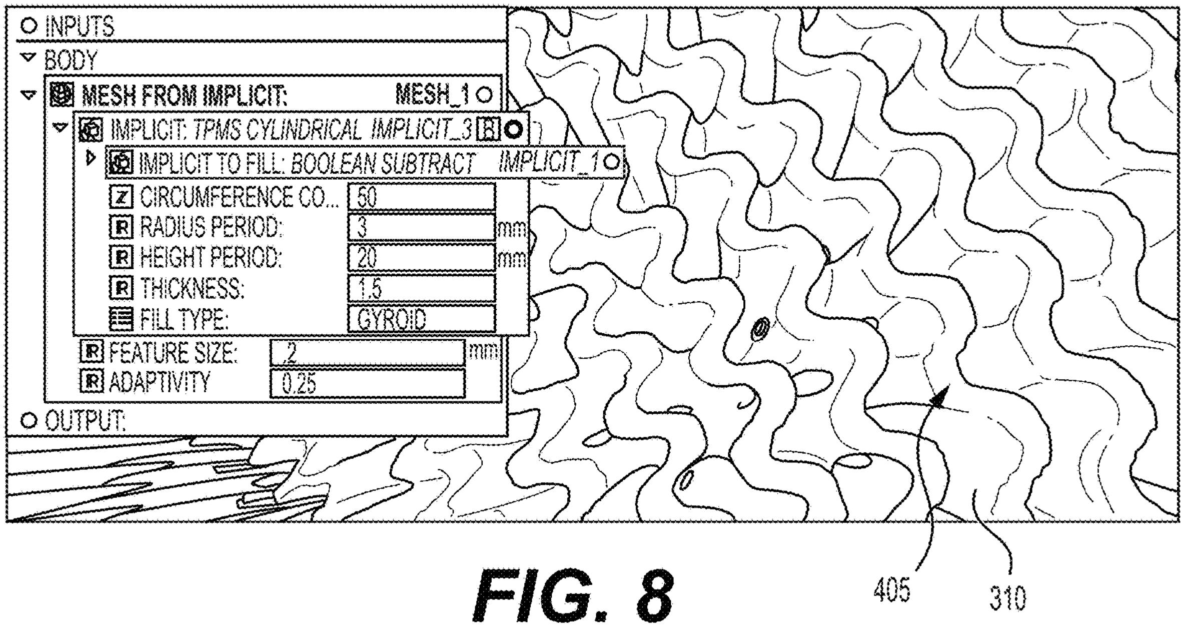
FIG. 8 depicts (in magnified view) another embodiment of an evaporation section of a heat pipe fuel element.

FIGS. 7 and 8 each depicts (in magnified view) an embodiment of evaporation section 200 of a heat pipe fuel element 40. FIG. 7 is a magnified view looking down the general direction of the axis 210 of the evaporation section 200 and FIG. 8 is a magnified view showing the wicking section of the heat pipe fuel element in the evaporation section 200. FIGS. 7 and 8 show schematic representations of the wicking structure 405 in the form of a mathematically-based periodic solid, including triply periodic minimal surfaces (TPMS), Schwarz minimal surfaces, gyroid structures, and lattice structures, and examples are disclosed in U.S. application Ser. No. 16/835,388, the entire contents of which are incorporated herein by reference. The surfaces 310 of the wicking structure 405 have a high surface area, which promotes efficient heat exchange from the working fluid within the heat sink structure 30.

Figure 9:
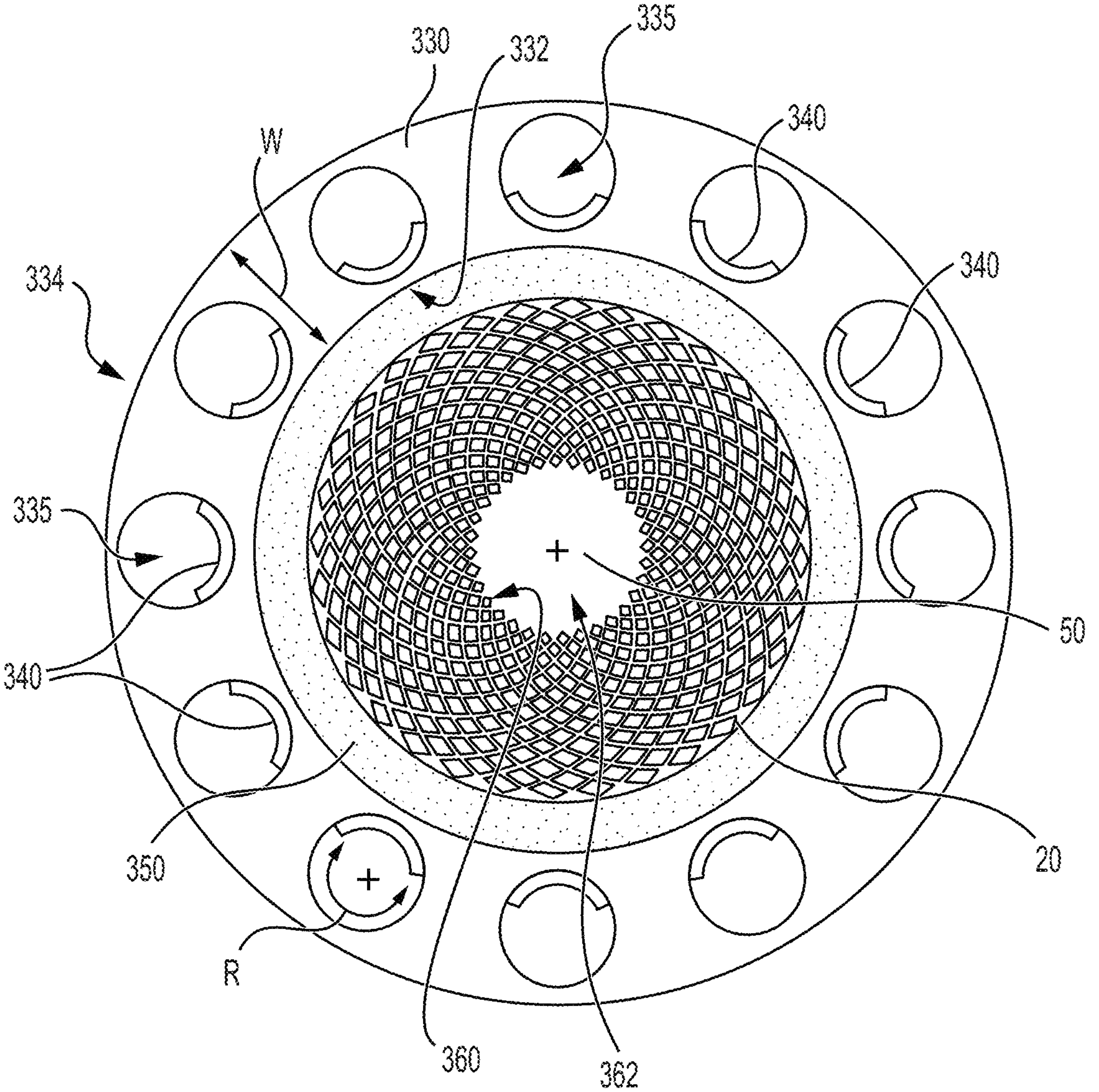
FIG. 9 is a schematic, cross-sectional view of an embodiment of a nuclear fission reactor structure showing a plurality of heat pipe fuel elements arranged in an active core region of a fission reactor in a phyllotaxis pattern and surrounded by a reflector.

FIG. 9 is a schematic, cross-sectional view (in a plane perpendicular to a longitudinal axis 50) of an embodiment of a nuclear fission reactor structure showing a plurality of heat pipe fuel elements 40 arranged in an active core region of a fission reactor 20 in a phyllotaxis pattern and surrounded by a reflector 330. In FIG. 9, a core former 350 is radially outward of the active core region and a reflector 330 is radially outward of the core former 350 (the radial direction being with respect to the longitudinal axis 50). A first surface of the core former 350 is conformal to the outer surface of the active core region and a second surface of the core former 350 is conformal to an inner surface 332 of the reflector 330. The inner surface 332 of the reflector 330 is oriented toward the active core region, and the core former 350 functions to mate the geometry of the outer surface of the active core region to the geometry of the inner surface 332 of the reflector 330.

A plurality of neutron absorber structures 335, each including a neutron absorber body 340, is located within a volume of the reflector 330 and movable, such as by rotation, between a first position and a second position, the first position being radially closer to the active core region than the second position. In exemplary embodiments, the first position is radially closest to the active core region 305 and the second position is radially farthest from the active core region 305. The neutron absorber body 340 is movable between the first position and the second position to control the reactivity of the active core region. In the illustrated example, the neutron absorber body 340 is rotatable from the first, radially closer position, to the second position by rotation (R) around an axis of the neutron absorber structure 335. However, other radial positions and/or movement directions can be implemented as long as the various positions to which the neutron absorber body 340 can be moved provides control of the reactivity of the active core region. In some embodiments, when the plurality of neutron absorber bodies 340 are each at the first, radially closer position, each of the plurality of neutron absorber bodies 340 are radially equidistant from the axial centerline of the active core region 305.

The reflector 330 functions to thermalize “reflected” neutrons travelling back into the active core region to increase criticality and reduces “leakage” of neutrons, which would have no chance to generate fission reactions and thus lowers the criticality potential of the nuclear fission reactor structure. Secondarily, the reflector 330 houses the neutron absorber bodies 340 of the neutron absorber structures 335, which are the primary system for reactivity control. In FIG. 9, the embodiment of a reflector 330 is in the form of an annulus and the neutron absorber bodies 340 are in the form of rotatable control drums. In order to house sufficiently sized neutron absorber bodies 340 in the form of rotatable control drums to control reactivity, the annulus of the reflector 330 cannot be overly thin (in width (W) between inner surface 332 and outer surface 334). In exemplary embodiments, the width (W) is 15 cm to 30 cm for a beryllium-based reflector. The width may vary based on the materials of the reflector 330 and. if applicable the weight requirements for non-terrestrial applications of the nuclear fission reactor structure, with materials with lower neutron reflecting properties requiring a thicker reflector, i.e., a large width (W).

In some embodiments, the design of the active core region is also an annulus. That is, the evaporation sections of the plurality of heat pipe fuel elements 40 are contained within an annular area (as seen in the cross-sectional view in, e.g., FIG. 9). An inner surface 360 of the annulus defines an opening 362, which can be configured to accommodate additional features. For example, in some optional embodiments, a secondary system for reactivity control, such as a control rod or safety shutdown rod (SCRAM rod), can be inserted into and withdrawn from the opening 362 to effect reactor control. In other optional embodiments, an inner reflector can be located in the opening 362. In still other optional embodiments, a target delivery system for isotopes can be inserted into and withdrawn from the opening 362.

Figure 10A:
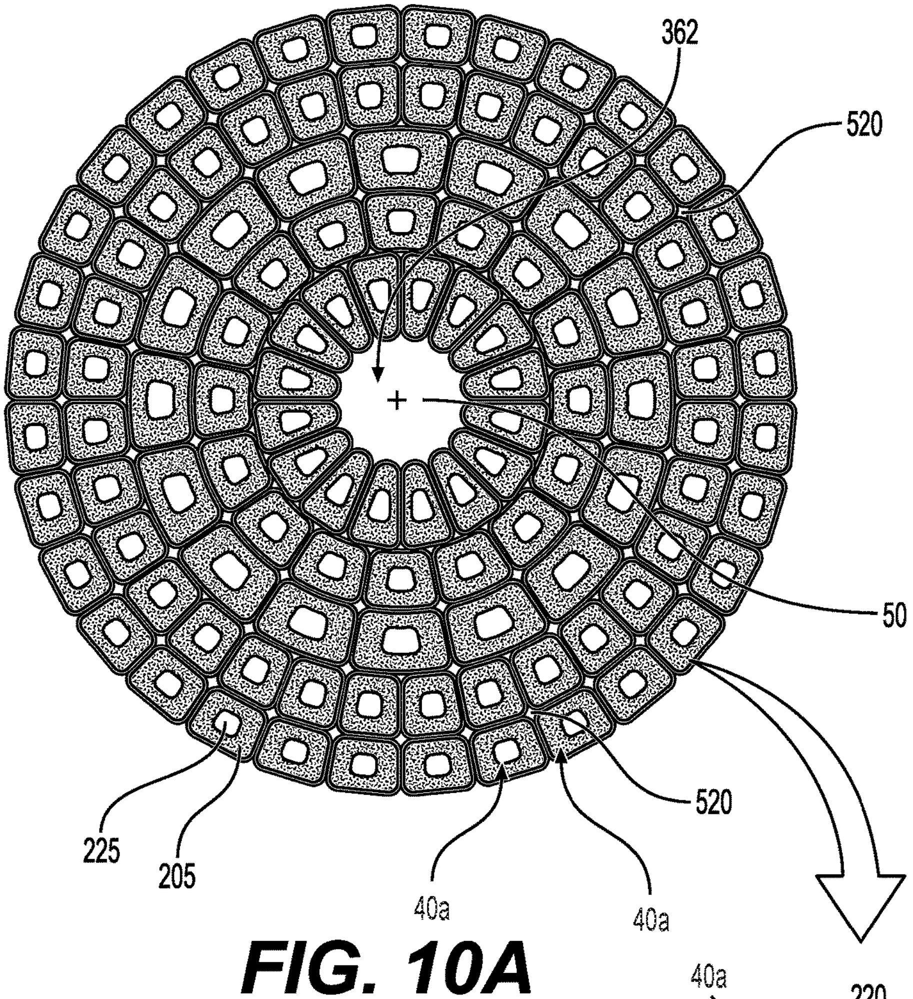
FIG. 10A is another example arrangement of the evaporation section of a plurality of heat pipe fuel elements in a fission reactor and FIG. 10B is a schematic representation of another embodiment of a cross-section of a heat pipe fuel element and showing the interior features.
Figure 10B:
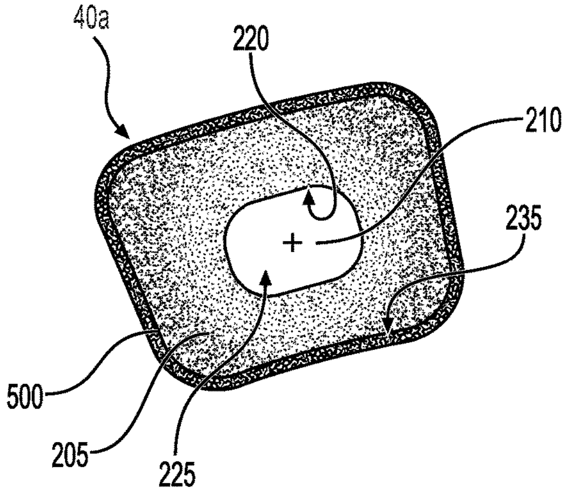

Although the active core region is illustrated with a phyllotaxis pattern (see, e.g., FIG. 9), alternative arrangements can be used, such as in a concentric ring pattern leading to a circular interface with the core former 325. rectangular packing patterns, circular packing patterns, and multimodal packing patterns, in each case with the evaporator sections 200 of the fuel element heat pipes in a closed-packed arrangement. FIG. 10A shows an example of a rectangular packing pattern, as well as the fuel body 205 and vaporization space 225 in each fuel element heat pipe. In exemplary embodiments, the cross-section geometries in the pattern of the active core region are arranged in close-packed relationship, in which the cross-sectional geometries, be it circular, polygonal, etc. . . . , are in the most tightly packed or space-efficient packing that maximizes the efficiency of packing and minimizes the volume of unfilled space. Shown in FIG. 10B is a magnified, schematic representation of a cross-section of one heat pipe fuel element **40*a* from the rectangular packing pattern in FIG. 10A and showing the interior features, including the fuel body 205 and the vaporization space 225**.

In some embodiments, adjacent heat pipe fuel elements 40, whether arranged in the phyllotaxis pattern or other closed-packed arrangement, can optionally be separated from each other by a stand-off distance. Such a stand-off distance defines a void space 520 and can contain a moderator material, such as graphite, or a non-moderator material. The presence of a stand-off distance, its size and location, and the inclusion of a moderator material or a non-moderator material depends on the design and neutronics of the active core region of the fission reactor. In alternative embodiments, the stand-off distance (and hence the void space) is not present or is nominal to accommodate manufacturing tolerances.

In exemplary embodiments, the nuclear fission reactor structure (including the active core region) is located within the interior volume of a pressure vessel. In such embodiments, braces can be attached to an inner surface of the pressure vessel and braces at a first location are connected to a first end plate of the nuclear fission reactor structure and braces at a second location are connected to a second end plate of the nuclear fission reactor structure. The pressure vessel is typically manufactured from stainless steel and can include sealable openings positioned to allow insertion and removal of ancillary equipment, such as instrumentation, control equipment and a target delivery system for isotopes. The heat sink structure can be external to the pressure vessel and the heat pipe fuel element 40, in particular, the capillary section, can extend through the pressure vessel to operatively connect the active core region with the heat sink structure.

Figure 11:
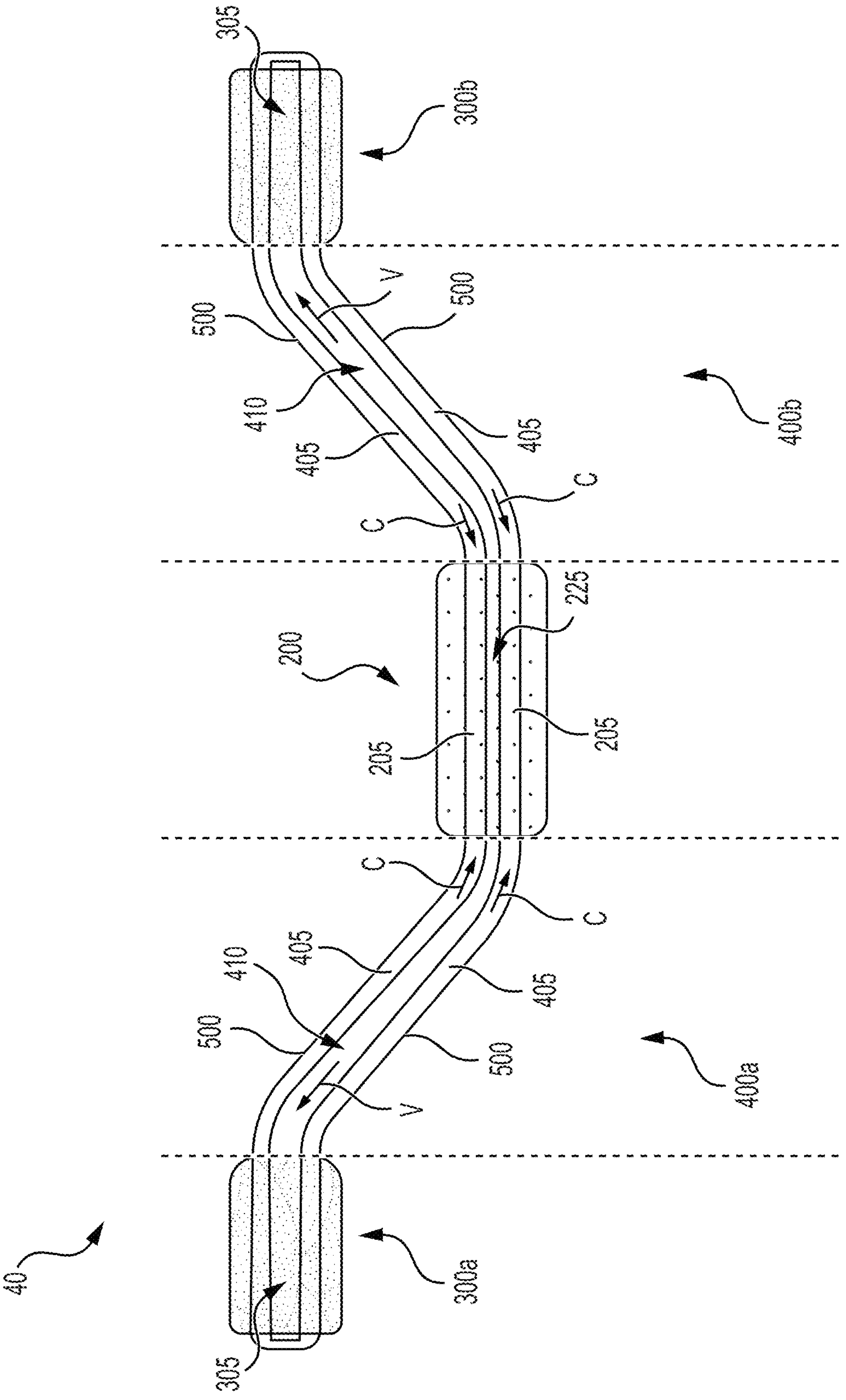
FIG. 11 schematically illustrates details of the arrangement of an individual double-sided heat pipe fuel element.

The heat pipe fuel element 40 can be single—sided, as shown and described with respect to, e.g., FIG. 3A, or the heat pipe fuel element 40 can be double-sided as shown and described with respect to, e.g., FIG. 11. FIG. 11 schematically illustrates details of the arrangement of an individual double-sided heat pipe fuel element. In a double-sided embodiment, the heat pipe fuel element 40 includes two capillary sections 400*a*, 400*b*, two condensing sections 300*a*, 300*b*, one evaporation section 200. A first condensing section 300*a* is at a first end of the heat pipe fuel element 40 and a second condensing section 300*b* is at a second end of the heat pipe fuel element 40. A first capillary section 400*a* connects the first condensing section 300*a* to the evaporation section 200 and a second capillary section 400*b* connects the second condensing section 300*b* to the evaporation section 200. In the double-sided embodiment, the heat pipe fuel element 40 has similar features and functions similarly to the single-sided heat pipe fuel element 40, with working fluid evaporated in the evaporation section 200 flowing to either of the condensing sections 300*a*, 300*b* via the corresponding capillary sections 400*a*, 400*b* and working fluid condensed in the respective condensing sections 300*a*, 300*b* returning to the evaporation section 200 via the corresponding capillary sections 400*a*, 400*b*.

The disclosed heat pipe fuel elements can be manufactured by suitable manufacturing methods. In one embodiment, a heat pipe fuel element is manufactured by a method that comprises enclosing a fuel body within a structural wall 500, i.e., a cladding layer, of at least an evaporation section 300 of a heat pipe fuel element 40. In one example, the fuel body 205 is manufactured as a cylinder or a rod and one or more fuel bodies 205 are inserted into an extruded tube that will form the structural wall. In other embodiments, the tube that will form the structural wall is swaged to shape around the one or more fuel bodies 205. With the fuel bodies retained in the evaporation section, either an additional tube that will form the structural wall for the condensing section 300 and the capillary section 400 is joined to the evaporation section 200 or, if the tube is longer than the evaporation section 200, the portions of the tube that will form the structural wall for the condensing section 300 and the capillary section 400 are shaped, such as by bending, to give the final form for the heat pipe fuel element 40. Subsequent to forming the shaped heat pipe fuel element 40 with an evaporation section, a condensing section, and a capillary section, and with the fuel body 205 and wick structure 405 located at suitable internal locations, a working fluid, i.e., the primary coolant, is added to the interior volume of the heat pipe fuel element. The structural wall is then sealed, for example by resistance welding end caps on one or both ends of the tube.

A plurality of heat pipe fuel elements can be assembled to form a fission reactor system. This includes arranging and joining evaporating sections of a plurality of heat pipe fuel elements to form a reactor bundle and incorporating condensing sections of the plurality of heat pipe fuel elements to form the heat sink structure. For example, the condensing section of the heat pipe fuel element, or at least a portion thereof, can be formed into portions of the heat sink structure, such as region 60 in the condensing section of each of the heat pipe fuel elements 40 in which the structural wall 70 has an increased surface area as shown, for example, in FIGS. 2A-B.

A fission reactor formed from a plurality of heat pipe fuel elements 40 as disclosed herein was simulated using Monte-Carlo N-Particle (MCNP) as a homogenous cylindrical core of all required atoms. In a first simulation, an outer reflector was included; in a second simulation, an outer reflector and an inner reflector were included. FIGS. 12A and 12B schematically illustrate these two simulation structures in top and side cross-sectional views, designated (I) and (II), respectively. In FIGS. 12A-B, the outer reflector 600 is 15 cm in the radial direction, the core 605 has a 100 cm outer diameter, and (where present) an inner reflector 610 that has a 15 cm outer diameter. FIG. 12C is a table showing materials for the noted features in seven examples (Examples 1-7) and reporting the criticality value from the MCNP simulation. All seven examples (Examples 1-7) showed viable criticality with a fast spectrum; however, some cases produced a slightly more thermal spectrum, as seen from the reactor neutron energy spectrums in FIG. 13. It should be noted that the cladding is not visible at the scale of FIGS. 12A-B, but a % volume cladding was considered in the FIG. 12C data to ensure that the effects were included in the MCNP simulation.

Figure 13:
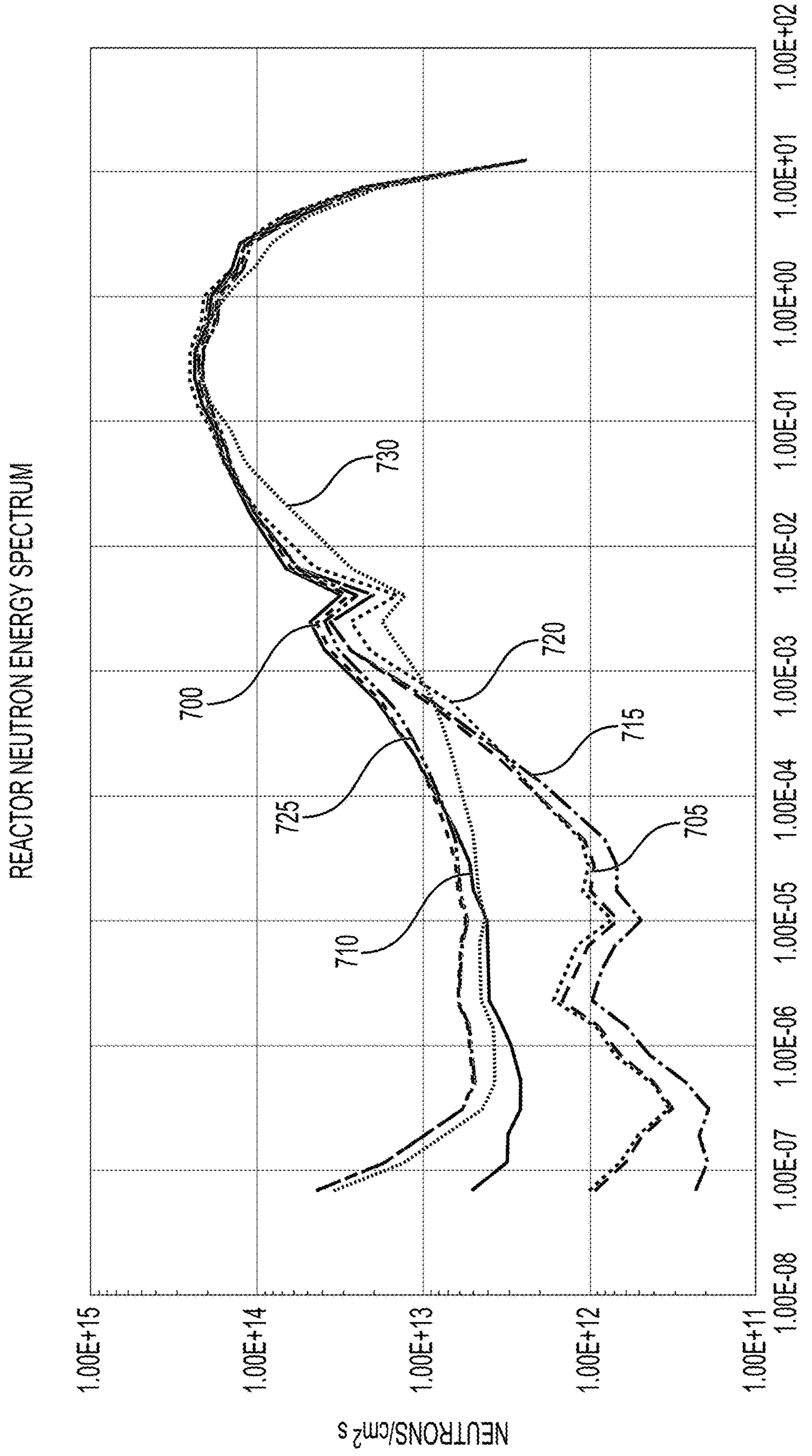
FIG. 13 is a graph showing the reactor neutron energy spectrum for the simulations from FIGS. 12A-C.

FIG. 13 is a graph showing the reactor neutron energy spectrum for the simulations from FIGS. 12A-C. FIG. 13 is a log-log plot in which neutron flux in neutrons per centimeter squared per second (neutrons/cm$^2$ s) is plotted as a function of energy in MeV for Examples 1-7 (Ex 1=700, Ex. 2=705, Ex. 3=710, Ex. 4=715, Ex. 5=720, Ex. 6=725, Ex. 7=730). In FIG. 13, simulations with higher left "tails" contain more thermal neutrons, which implies a higher chance of fission events per neutron generated (i.e., a more efficient core).

Figure 14:
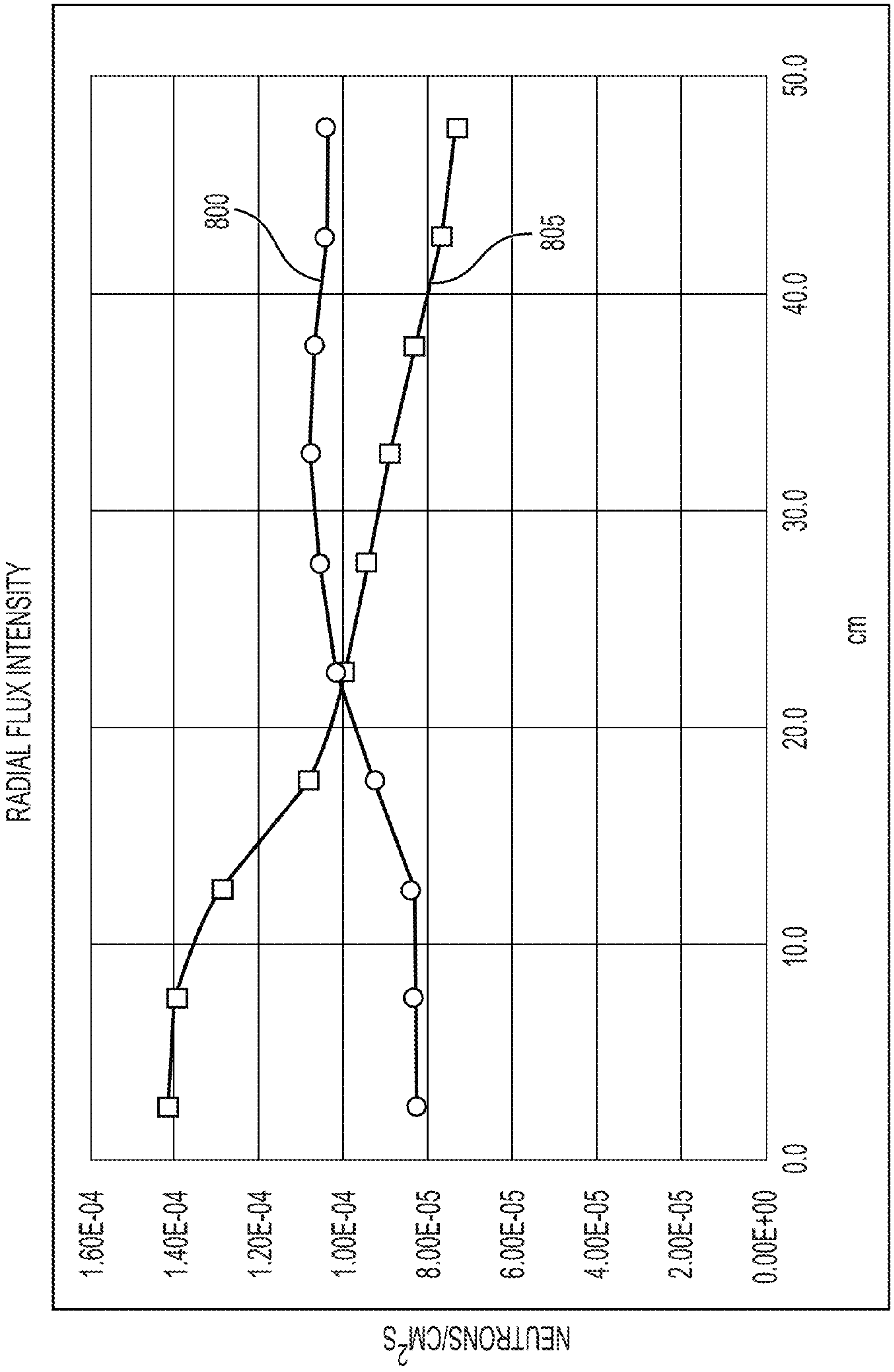
FIG. 14 is a graph showing the radial flux intensity with and without an inner reflector for two of the simulations in FIGS. 12A-C.

FIG. 14 is a graph showing the radial flux intensity in neutrons per centimeter squared per second (neutrons/cm 2 s) as a function of radial position (in cm from the axial centerline) for the two simulation structures in FIGS. 12A-B, i.e., with and without an inner reflector. Plot 800 is the radial flux intensity with an inner reflector (corresponding to the simulation for FIG. 12A) and Plot 805 is the radial flux intensity without an inner reflector (corresponding to the simulation for FIG. 12B). FIG. 14 shows that the flux intensity is not constant in the core in the region from 15 cm to 50 cm for either Plot 800 or Plot 805. However, it is considered that fuel loading in the fuel element or the volumetric ratios can be altered to mute flux peaks in the core and that constant radial flux and fission intensity in the core can be achieved which would mitigate material hot spots.

In summary, the simulations demonstrate that the material allocation and fuel loading for the disclosed fuel element heat pipe and fission reactor systems incorporating such fuel element heat pipes can be altered to produce desired nuclear properties without negatively impacting the criticality and radioactive control of the core.

The heat pipe fuel element and fission reactor system disclosed herein can alternatively be embodied in a loop heat pipe design. In heat loop embodiments, the features of the heat pipe are arranged in a loop system with a vapor line providing transport of vapor from the evaporation section to the condensing section and a liquid line providing transport of liquid from the condensing section to the evaporation section.

The heat pipe fuel element and fission reactor system disclosed herein has several advantages over prior reactor designs. For example, a large number of welds are eliminated with the heat pipe fuel element, particularly in the active core region where the structural wall, i.e., cladding, of the heat pipe fuel element can be embodied in a seamless tube. Direct cooling of the fuel body, for example, by the working fluid directly contacting the surfaces of the fuel body, can reduce heat gradients. Direct cooling may also be more resilient to a failure of an individual heat pipe fuel element. Also, the phyllotaxis arrangement of the heat pipe fuel element for the evaporation sections more efficiently places fissionable fuel in a compact form allowing for less absorbing or non-functional material, particularly in the active core region.

Figure 15:
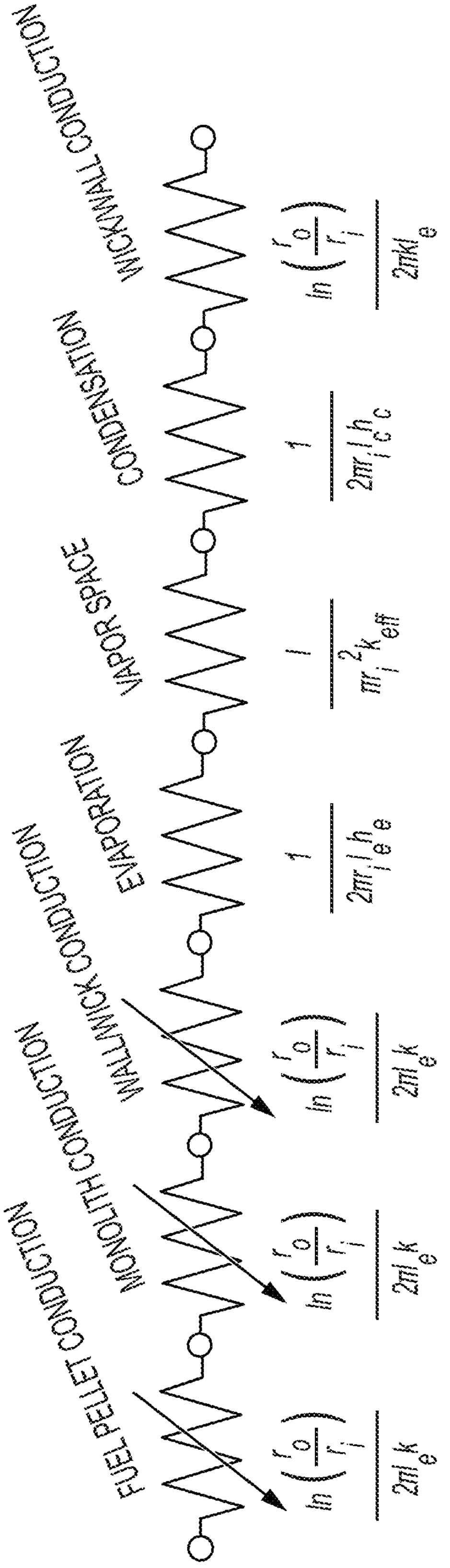
FIG. 15 shows the heat pipe thermal performance equation relevant to the disclosed heat pipe fuel element.

Finally, the heat pipe fuel element and fission reactor system disclosed herein eliminates thermal resistances fond in conventional systems. In particular, FIG. 15 shows the heat pipe thermal performance equation, which includes terms for various factors contributing to heat pipe performance. By using a fuel body with the fissionable fuel composition as the heat pipe inner material, the first three terms in the heat pipe thermal performance equation can be eliminated (as represented by the arrows in FIG. 15). Furthermore, direct evaporation on surfaces of the fuel body enhances heat transfer and reduces thermal resistance by a temperature drop that would otherwise be present in heat pipe designs not incorporating the fuel body interior to the structural wall of the heat pipe.

The arrangements shown and described herein are each a singular example and the base dimensions disclosed herein can be altered to optimize different reactor properties based on material ratios (e.g. fuel enrichment or U-235 mass minimization).

Although the present invention has been described in connection with embodiments thereof, it will be appreciated by those skilled in the art that additions, deletions, modifications, and substitutions not specifically described may be made without departure from the spirit and scope of the invention as defined in the appended claims. For example, although described in relation to fissionable fuel materials, nuclear reactors, and associated components, the principles, compositions, structures, features, arrangements and processes described herein can also apply to other materials, other compositions, other structures, other features, other arrangements and other processes as well as to their manufacture and to other reactor types.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A heat pipe fuel element, comprising:

an evaporation section;

a condensing section;

a capillary section connecting the evaporation section to the condensing section; and a primary coolant, wherein, in the evaporation section and in a cross-section in a plane perpendicular to a longitudinal axis of the evaporation section, the heat pipe fuel element includes a cladding layer enclosing an interior area, wherein the interior area enclosed by the cladding layer includes a fuel body and a vaporization space, wherein the fuel body is located between the cladding layer and the vaporization space and the fuel body has an outer surface oriented toward the cladding layer and an inner surface defining a periphery of the vaporization space of the evaporation section, wherein the inner surface of the fuel body is in direct contact with the primary coolant, and wherein the fuel body is formed of a fissionable fuel composition.

2. The heat pipe fuel element according to claim 1, wherein the interior area enclosed by the cladding layer further includes a first moderator material located between the outer surface of the fuel body and an interior surface of the cladding layer.

3. The heat pipe fuel element according to claim 1, wherein the evaporation section is at a first end of the heat pipe fuel element and the condensing section is at a second end of the heat pipe fuel element.

4. The heat pipe fuel element according to claim 1, wherein the heat pipe fuel element includes two capillary sections and two condensing sections, wherein a first condensing section is at a first end of the heat pipe fuel element and a second condensing section is at a second end of the heat pipe fuel element, and wherein a first capillary section connects the first condensing section to the evaporation section and a second capillary section connects the second condensing section to the evaporation section.

5. The heat pipe fuel element according to claim 1, wherein the capillary section includes a wick structure in contact with an interior surface of the heat pipe fuel element.

6. The heat pipe fuel element according to claim 5, wherein the wick structure is a mesh of sintered metal.

7. The heat pipe fuel element according to claim 1, wherein the condensing section is elevated relative to the evaporation section.

8. The heat pipe fuel element according to claim 1, wherein the primary coolant is a liquid metal.

9. The heat pipe fuel element according to claim 8, wherein the liquid metal is sodium or a sodium-containing alloy.

10. The heat pipe fuel element according to claim 1, wherein the cladding layer forms at least a portion of an exterior wall of the heat pipe fuel element.

11. The heat pipe fuel element according to claim 1, wherein, in the evaporation section, the cladding layer is a seamless continuous tube.

12. The heat pipe fuel element according to claim 1, wherein, in the evaporation section and in the cross-section in the plane perpendicular to the longitudinal axis of the evaporation section, the cladding layer enclosing the interior area has a shape of a polygon.

13. The heat pipe fuel element according to claim 12, wherein the polygon is a quadrilateral.

14. The heat pipe fuel element according to claim 13, wherein the quadrilateral is skewed.

15. The heat pipe fuel element according to claim 1, wherein the fuel body has a structure with a shape corresponding to a mathematically-based periodic solid.

16. The heat pipe fuel element according to claim 15, wherein surfaces of the mathematically-based periodic solid define a plurality of channels in the body, and wherein the structure has a volumetric density of 35% to 85%.

17. The heat pipe fuel element according to claim 16, wherein the mathematically-based periodic solid is a triply periodic minimal surface (TPMS).

18. The v according to claim 17, wherein the triply periodic minimal surface (TPMS) is a Schwarz minimal surface.

19. The heat pipe fuel element according to claim 17, wherein the triply periodic minimal surface (TPMS) is a gyroid structure.

20. The heat pipe fuel element according to claim 16, wherein the mathematically-based periodic solid is a lattice structure.

21. The heat pipe fuel element according to claim 1, wherein the uranium-based fissionable fuel composition includes uranium having an enrichment of up to 20%, and wherein a specific enrichment of the fuel body (% enrichment per unit volume) is constant±2%.

22. The heat pipe fuel element according to claim 1, wherein the uranium-based fissionable fuel composition includes uranium nitride, uranium oxide, U10Mo, or a cermet thereof.

23. The heat pipe fuel element according to claim 1, wherein the uranium-based fissionable fuel composition is (a) high-assay low-enriched uranium (HALEU) with a U-235 assay equal to or greater than 5 percent and equal to or lower than 20 percent or (b) highly enriched uranium (HEU) with 20% or more U-235.

24. The heat pipe fuel element according to claim 1, wherein the primary coolant circulates within the heat pipe in a closed loop between the condensing section and the evaporation section via the capillary section.

25. The heat pipe fuel element according to claim 24, wherein, in the evaporation section, the primary coolant forms a vapor, and wherein, in the condensing section, the vapor condenses to form a liquid.

* * * * *